(12) United States Patent
Sivulka

(10) Patent No.: US 12,393,788 B2
(45) Date of Patent: Aug. 19, 2025

(54) MATRIX USER INTERFACE FOR LLM-POWERED DATA ANALYSIS AND GENERATION

(71) Applicant: Hebbia Inc., New York, NY (US)

(72) Inventor: George Sivulka, New York, NY (US)

(73) Assignee: Hebbia Inc., New York, NY (US)

( * ) Notice: Subject to any disclaimer, the term of this patent is extended or adjusted under 35 U.S.C. 154(b) by 0 days.

(21) Appl. No.: 18/961,186

(22) Filed: Nov. 26, 2024

(65) Prior Publication Data

US 2025/0173328 A1    May 29, 2025

Related U.S. Application Data

(60) Provisional application No. 63/563,117, filed on Mar. 8, 2024, provisional application No. 63/604,124, filed on Nov. 29, 2023.

(51) Int. Cl.
  *G06F 16/00*   (2019.01)
  *G06F 16/22*   (2019.01)
  *G06F 16/242*  (2019.01)
  *G06F 16/248*  (2019.01)

(52) U.S. Cl.
  CPC .......... *G06F 16/248* (2019.01); *G06F 16/221* (2019.01); *G06F 16/243* (2019.01)

(58) Field of Classification Search
  CPC ..... G06F 16/243; G06F 16/221; G06F 16/248
  USPC .................................................. 707/600–899
  See application file for complete search history.

(56) References Cited

U.S. PATENT DOCUMENTS

| | | |
|---|---|---|
| 11,829,950 B2 | 11/2023 | Shah et al. |
| 12,147,758 B1 | 11/2024 | Thomas et al. |
| 12,248,751 B1 | 3/2025 | Neervannan et al. |
| 2023/0186025 A1 | 6/2023 | John et al. |
| 2023/0376900 A1 | 11/2023 | Shah et al. |
| 2024/0028312 A1 | 1/2024 | Gillman et al. |
| 2024/0126776 A1* | 4/2024 | Shmulyan ......... G06F 16/24578 |
| 2024/0303235 A1* | 9/2024 | Kulkarni ........... G06F 16/24522 |

(Continued)

FOREIGN PATENT DOCUMENTS

WO    WO-2025/042762 A1    2/2025

OTHER PUBLICATIONS

PCT International Search Report and Written Opinion, PCT Application No. PCT/US2024/057543, Jan. 27, 2025, 24 pages.

(Continued)

*Primary Examiner* — Michelle N Owyang
(74) *Attorney, Agent, or Firm* — Fenwick & West LLP

(57) ABSTRACT

A data analytics system uses a grid-based data structure to improve the usability of LLMs in the analysis of large data sets, to synthesize information for use in other generative AI contexts, and to improve a user's ability to interface with an LLM. A grid-based data structure is a data structure or database that stores the results of column prompts applied to sources. The grid-based data structure may store the results in a relational manner. For example, a grid-based data structure may have rows that correspond to sources (e.g., documents, files, or databases) and columns that correspond to prompts. Each cell of the grid-based data structure stores the output of the column prompt applied to a source using an LLM. Thus, each column prompt may be systematically applied to each source to generate information based on the sources in an organized way.

20 Claims, 22 Drawing Sheets

(56) References Cited

U.S. PATENT DOCUMENTS

| | | |
|---|---|---|
| 2024/0354584 A1* | 10/2024 | Mukherjee .......... G06F 18/2415 |
| 2024/0362497 A1 | 10/2024 | Grenader et al. |
| 2024/0378375 A1* | 11/2024 | Coate ..................... G06F 40/18 |
| 2024/0386058 A1 | 11/2024 | Thomas et al. |
| 2024/0419705 A1 | 12/2024 | Kotaru |
| 2024/0419923 A1 | 12/2024 | Chollampatt Muhammed Ashraf et al. |
| 2024/0420418 A1 | 12/2024 | Wu et al. |
| 2025/0006196 A1 | 1/2025 | Wang et al. |
| 2025/0094703 A1* | 3/2025 | Malak ..................... G06F 40/20 |

OTHER PUBLICATIONS

United States Notice of Allowance, U.S. Appl. No. 18/961,216, filed Feb. 7, 2025, 10 pages.

* cited by examiner

Email Analysis

| Email Add Docs + | Date Sent Edit | Author Edit | Summary Edit | Spam/ Junk? Edit | Respond- by Date Edit |
|---|---|---|---|---|---|
| MeetingRequest_John Doe_2024_10_12.eml | 10/12/24 | John Doe | Request to schedule a meeting next week to discuss the new project. | No | 10/16/24 |
| Reminder_Presentation Due_JaneSmith_2024_ 10_11.eml | 10/11/24 | Jane Smith | Reminder about the upcoming presentation deadline at the end of the week. | No | 10/14/24 |
| Offer_UpgradeService_ Spam_2024_10_10.eml | 10/10/24 | Upgrade Services Team | SPAM: Promotional offer for a discounted service upgrade. | Yes | N/A |
| InterviewRequest_Sara Miller_2024_10_08.eml | 10/9/24 | Sara Miller | Invitation to schedule an interview for a potential job position. | No | 10/13/24 |
| Newsletter_ACorp_Spa m_2024_10_07.eml | 10/7/24 | ACorp Marketing | SPAM: Monthly newsletter featuring the latest product releases and promotions. | Yes | N/A |

FIG. 2

Email Analysis ~1110

| Email<br>Add Docs + | Date Sent<br>Edit ✎ | Author<br>Edit ✎ | Summary<br>Edit ✎ | Spam/<br>Junk?<br>Edit ✎ | Respond-<br>by Date<br>Edit ✎ |
|---|---|---|---|---|---|
| MeetingRequest_JohnDoe_2024_10_12.eml | 10/12/24 | John Doe | Request to schedule a meeting next week to discuss the new project. | No | 10/16/24 |
| Reminder_PresentationDue_JaneSmith_2024_10_11.eml | 10/11/24 | Jane Smith | Reminder about the upcoming presentation deadline at the end of the week. | No | 10/14/24 |
| Offer_UpgradeService_Spam_2024_10_10.eml | 10/10/24 | Upgrade Services Team | SPAM: Promotional offer for a discounted service upgrade. | Yes | N/A |
| InterviewRequest_SaraMiller_2024_10_08.eml | 10/9/24 | Sara Miller | Invitation to schedule an interview for a potential job position. | No | 10/13/24 |
| Newsletter_ACorp_Spam_2024_10_07.eml | 10/7/24 | ACorp Marketing | SPAM: Monthly newsletter featuring the latest product releases and promotions. | Yes | N/A |

~1140

Type your questions here!

Who was the last person who emailed me about my upcoming presentation?

Jane emailed you on October 11, 2024 about your presentation deadline at the end of the week ~1130

Email Analysis — 1410

| Email<br>Add Docs + | Date Sent<br>Edit ✎ | Author<br>Edit ✎ | Summary<br>Edit ✎ | Spam/<br>Junk?<br>Edit ✎ | Respond-<br>by Date<br>Edit ✎ |
|---|---|---|---|---|---|
| MeetingRequest_JohnDoe_2024_10_12.eml | 10/12/24 | John Doe | Request to schedule a meeting next week to discuss the new project. | No | 10/16/24 |
| Reminder_PresentationDue_JaneSmith_2024_10_11.eml | 10/11/24 | Jane Smith | Reminder about the upcoming presentation deadline at the end of the week. | No | 10/14/24 |
| Offer_UpgradeService_Spam_2024_10_10.eml | 10/10/24 | Upgrade Services Team | SPAM: Promotional offer for a discounted service upgrade. | Yes | N/A |
| InterviewRequest_SaraMiller_2024_10_08.eml | 10/9/24 | Sara Miller | Invitation to schedule an interview for a potential job position. | No | 10/13/24 |
| Newsletter_ACorp_Spam_2024_10_07.eml | 10/7/24 | ACorp Marketing | SPAM: Monthly newsletter featuring the latest product releases and promotions. | Yes | N/A |

1400

Generate an email summarizing the emails that I got this week.

1450

To: user@email.com
From: info@dataanalytics.com
Subj: Summary of Emails
Contents:

Dear User,

This week, you received five emails. Two of the emails were spam or junk emails. John Doe emailed you requesting to schedule a meeting regarding your new project. Jane Smith reminded you about your upcoming presentation deadline. Sara Miller asked to schedule an interview for the open position.

[Download] — 1460

FIG. 14B

Email Analysis — 1410

| Email<br>Add Docs + | Date Sent<br>Edit ✎ | Author<br>Edit ✎ | Summary<br>Edit ✎ | Spam/Junk?<br>Edit ✎ | Respond-by Date<br>Edit ✎ |
|---|---|---|---|---|---|
| MeetingRequest_JohnDoe_2024_10_12.eml | 10/12/24 | John Doe | Request to schedule a meeting next week to discuss the new project. —1480 | No | 10/16/24 —1480 |
| Reminder_PresentationDue_JaneSmith_2024_10_11.eml | 10/11/24 | | | No | 10/14/24 |
| Offer_UpgradeService_Spam_2024_10_10.eml | 10/10/24 | Upgrade Services Team | SPAM: Promotional offer for a discounted service upgrade. | Yes | N/A |
| InterviewRequest_SaraMiller_2024_10_08.eml | 10/9/24 | Sara Miller | Invitation to schedule an interview for a potential job position. | No | 10/13/24 |
| Newsletter_ACorp_Spam_2024_10_07.eml | 10/7/24 | ACorp Marketing | SPAM: Monthly newsletter featuring the latest product releases and promotions. | Yes | N/A |

1400 —
Generate an email summarizing the emails that I got this week.

To: user@email.com
From: info@dataanalytics.com
Subj: Summary of Emails
Contents:

Dear User,

This week, you received five emails. Two of the emails were spam or junk emails. John Doe emailed you 1470 requesting to schedule a meeting regarding your new project. Jane Smith reminded you about your upcoming presentation deadline. Sara Miller asked to schedule an interview for the open position.

[Download]

MATRIX USER INTERFACE FOR LLM-POWERED DATA ANALYSIS AND GENERATION

CROSS-REFERENCE TO RELATED APPLICATIONS

This application claims the benefit of U.S. Provisional Patent Application No. 63/604,124, entitled "Matrix User Interface for LLM-Powered Data Analysis and Generation" and filed Nov. 29, 2023, and U.S. Provisional Patent Application No. 63/563,117, entitled "Matrix User Interface for LLM-Powered Data Analysis and Generation" and filed Mar. 8, 2024, each of which is incorporated by reference.

BACKGROUND

Generative models, including large language models (LLMs), are machine-learning algorithms that leverage significant numbers of parameters to analyze input data ("prompts") from users and create an appropriate response. Many systems allow users to interact with generative models through a chat user interface wherein a user provides a prompt and the model provides a response. While these interfaces may be effective for one-off prompts that a user may have, they are ineffective for when a user wants to perform many prompts across many sources of data. For example, if a user wants to have an LLM generate multiple pieces of information from a document, the user generally must create multiple prompts to the LLM or must craft a long, complicated prompt that requests all the information. On the other hand, if a user wants to extract the same information across multiple different documents, the user generally must repeatedly create prompts containing the context of each of the documents. Thus, while chat interfaces can be effective in certain circumstances, they are ineffective at allowing users to use generative models to run multiple prompts across multiple sources.

Moreover, the output of generative models often decays in proportion to the complexity of the reasoning required to respond to a prompt correctly. Standard chat interfaces, limited to a single dialogue thread, constrain the possible complexity of tasks to a single line of reasoning. In order to get AI-powered systems to correctly execute complex "multi-step" reasoning, repeated "single-step" analysis across many prompts and many sources is often necessary. This has the added benefit of building trust, observability, and explainability to system output.

In addition, generative models are limited by their context window, and slow down exponentially for each amount of data that is added to the current context. For example, most documents have more words than can currently fit in the context window of the best LLMs available, and inference is slow for any long document. This limits the number of sources and prompts that can be analyzed in a single model thread.

SUMMARY

A data analytics system uses a grid-based data structure to improve the usability of LLMs in the analysis of large data sets, to synthesize information for use in other generative AI contexts, and to improve a user's ability to interface with an LLM.

A grid-based data structure is a data structure or database that stores the results of column prompts applied to sources. The grid-based data structure may store the results in a relational manner. For example, a grid-based data structure may have rows that correspond to sources (e.g., documents, files, or databases) and columns that correspond to prompts. Each cell of the grid-based data structure stores the output of the column prompt applied to a source using an LLM. Thus, each column prompt may be systematically applied to each source to generate information based on the sources in an organized way.

The data analytics system may present a grid-based data structure through a matrix user interface. The matrix user interface displays the grid-based data structure as a matrix in the user interface, where the rows of the matrix correspond to the rows of the grid-based data structure and the columns of the matrix correspond to the columns of the grid-based data structure. Each cell of the matrix contains text output by an LLM when the prompt of its corresponding column is applied to the source of its corresponding row. A user can use the matrix user interface to add, edit, or remove column prompts or to set parameters for how those prompts are input to an LLM. The user can also use the matrix user interface to upload sources to the data analytics system or to provide locator information from which the data analytics system may retrieve data for the sources.

A matrix user interface provides many improvements to the technical fields of user interfaces and large language models. A matrix user interface allows a user to perform and utilize LLM-based analytics in a way that is practically impossible through traditional approaches, such as through a chat interface. The matrix user interface leverages the unique relational structure of the grid-based data structure to effectively correlate the input data to the LLM with inferences and predictions made by the LLM. Thus, the matrix user interface expands the capabilities of LLMs.

Furthermore, as noted above, an LLM's context window generally limits its ability to analyze large documents with a single prompt. This limits the data analytics system's ability to apply column prompts to sources to generate cell contents. The data analytics system may address this limitation of LLMs by generating context window prompts that include chunks of a source. Each chunk comprises a set of semantically-related sections of content within a source. The data analytics system generates a context window prompt by collecting a set of chunks together that fit within the context window of the LLM and prompts the LLM with one of the column prompts based on the chunks. The data analytics system iteratively generates chunks of a source and generates context window prompts based on those chunks until the data analytics system has applied a column prompt to all relevant sections of a source. The data analytics system generates a final prompt based on the responses to the context window prompts and uses the LLM's response to the final prompt to generate the contents of a cell. Thus, the data analytics system can effectively overcome the technical limitation of the LLM's context window in applying a column prompt to a large source.

The data analytics system may also provide pre-generated column prompts to a user to include in a grid-based data structure. These pre-generated column prompts may include prompt templates with fields that a user can fill in with relevant information and may be editable by the user through the matrix user interface. Additionally, the data analytics system may automatically generate column prompts for a user based on a text query. The text query describes the user's intent with regards to generating a grid-based data structure, and the data analytics system uses the text query to identify pre-generated column prompts that are relevant to the text query. The data analytics system generates new column prompts based on the text query and the identified pre-generated column prompts. The data analytics system transmits this prompt to the LLM and receives a response with column prompts to include in the grid-based data structure. Thus, the data analytics system can automate the generation of data structures for the analysis of sources through an LLM.

The data analytics system may also provide services that leverage a grid-based data structure to provide enhanced generative functionality. For example, the data analytics system can integrate a grid-based data structure with a chat interface such that the data analytics system leverages the information in the grid-based data structure to answer chat queries from a user. The data analytics system uses the chat query to identify cells in a grid-based data structure that contain relevant information for answering the chat query. For example, the data analytics system may generate a set of rules for identifying sources that may be relevant to answering the chat query and applies those rules to the sources to identify which cells to use for answering the chat query. The data analytics system generates a prompt for answering the chat query based on the identified cells and the user's chat query. This prompt also may include information about or portions from the sources. The data analytics system transmits this prompt to the LLM and receives a response that includes text for a response to the user's chat query.

The data analytics system may perform similar processes for generating other types of content items beyond chart responses, such as text documents, slides, spreadsheets, or emails. The data analytics system may receive a content item request that specifies a type of content item to generate and a text query describing the content item to be generated. Similar to responding to a chat query, the data analytics system may use the text query to identify cells in a grid-based data structure to use to generate the content item. The data analytics system generates a prompt requesting that the LLM generate content item data to be included in a content item. This prompt may include the text query, the identified cells from the grid-based data structure, and information from or about sources. The data analytics system receives the content item data in a response to the prompt and uses the content item data to generate the content item. The data analytics system transmits this content item to the user's client device for display to the user.

In some embodiments, the data analytics system highlights cells in a grid-based data structure based on a selected portion of a displayed content item. The data analytics system receives a selection of a portion of a content item through a matrix user interface. The data analytics system identifies a set of output tokens generated by the LLM that correspond to the selected portion of the content item and retrieves sets of attention scores for those output tokens. Each set of attention scores for an output token represent the weights of input tokens from cells that were included in the prompt used to generate the corresponding output token. The data analytics system identifies the attention scores that correspond to the input tokens of a cell and uses those attention scores to compute an aggregated cell score for the cell. The data analytics system uses those cell scores to determine how much to highlight each cell in a matrix user interface. The data analytics system can thereby indicate to a user how much a particular cell contributed to the selected portion of a content item, which improves the human explainability of the LLM's output. A human can also thereby edit a cell of the grid-based data structure to correct any hallucinations of the LLM.

BRIEF DESCRIPTION OF THE DRAWINGS

FIG. 2 illustrates an example matrix user interface, in accordance with some embodiments.

FIG. 11 illustrates an example chat interface, in accordance with some embodiments.

FIG. 14B illustrates an example content generation interface displaying a content item generated by the data analytics system, in accordance with some embodiments.

FIG. 14C illustrates an example content generation interface displaying a selected portion of a content item generated by the data analytics system, in accordance with some embodiments.

DETAILED DESCRIPTION

Example System Environments

Figure 1A:
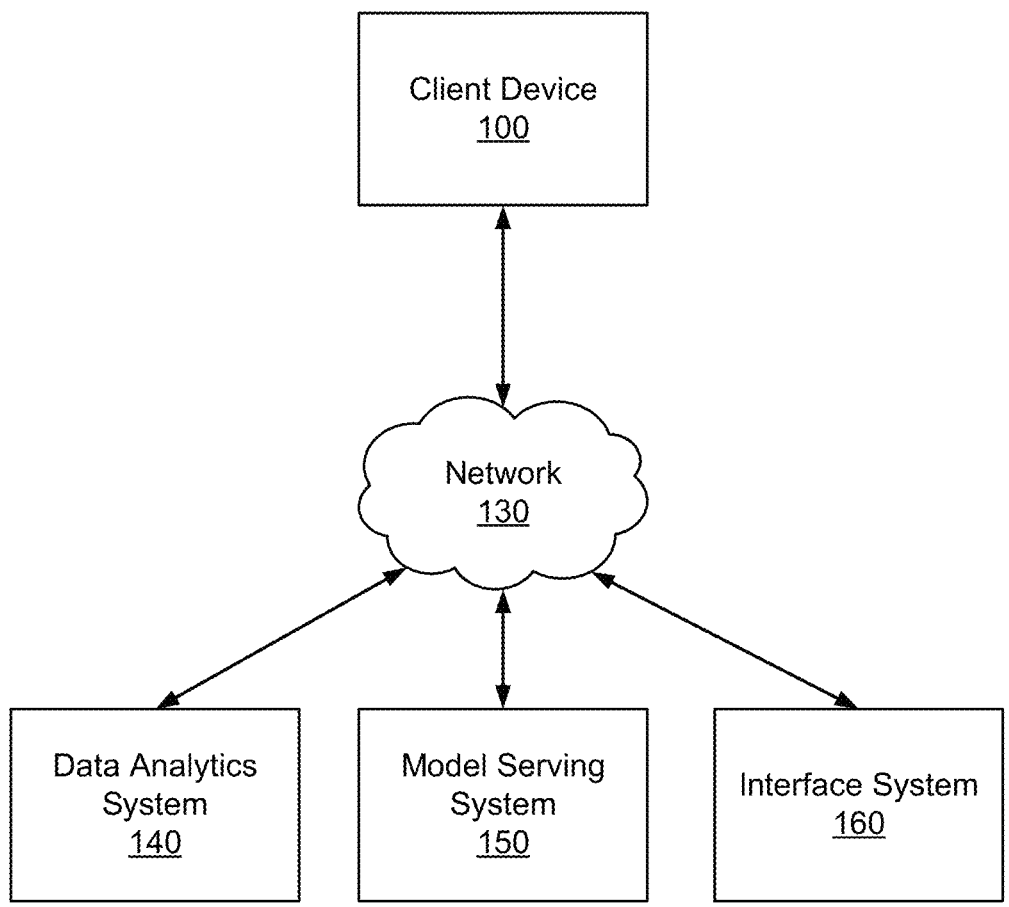
FIG. 1A illustrates an example system environment for a data analytics system, in accordance with one or more embodiments.

FIG. 1A illustrates an example system environment for a data analytics system 140, in accordance with one or more embodiments. The system environment illustrated in FIG. 1A includes a client device 100, a network 130, a data analytics system 140, a model serving system 150, and an interface system 160. Alternative embodiments may include more, fewer, or different components from those illustrated in FIG. 1A, and the functionality of each component may be divided between the components differently from the description below. Additionally, each component may perform their respective functionalities in response to a request from a human, or automatically without human intervention.

The client device 100 is a device through which a user may interact with the data analytics system 140, the model serving system 150, or the interface system 160. The client device 100 can be a personal or mobile computing device, such as a smartphone, a tablet, a laptop computer, or desktop computer. In some embodiments, the client device 100 executes a client application that uses an application programming interface (API) to communicate with the data analytics system 140.

The client device 100, the data analytics system 140, the model serving system 150, and the interface system 160 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of standard layers used to describe a physical or virtual network, such as the physical layer, the data link layer, the network layer, the transport layer, the session layer, the presentation layer, and the application layer. The network 130 may include physical media for communicating data from one computing device to another computing device, such as MPLS lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The data analytics system 140 is an online system by users can analyze data in documents. The data analytics system 140 may provide a matrix user interface to the client device 100. The data analytics system 140 generates prompts based on the inputs provided by the user through the matrix user interface and uses an LLM in the model serving system 150 to generate response to those prompts. Functionality of the data analytics system 140 is described in further detail below.

The model serving system 150 receives requests from the data analytics system 140 to perform tasks using machine-learned models. The tasks include, but are not limited to, natural language processing (NLP) tasks, audio processing tasks, image processing tasks, video processing tasks, and the like. In one embodiment, the machine-learned models deployed by the model serving system 150 are models configured to perform one or more NLP tasks. The NLP tasks include, but are not limited to, text generation, query processing, machine translation, chatbots, and the like. In one embodiment, the language model is configured as a transformer neural network architecture. Specifically, the transformer model is coupled to receive sequential data tokenized into a sequence of input tokens and generates a sequence of output tokens depending on the task to be performed.

The model serving system 150 receives a request including input data (e.g., text data, audio data, image data, or video data) and encodes the input data into a set of input tokens. The model serving system 150 applies the machine-learned model to generate a set of output tokens. Each token in the set of input tokens or the set of output tokens may correspond to a text unit. For example, a token may correspond to a word, a punctuation symbol, a space, a phrase, a paragraph, and the like. For an example query processing task, the language model may receive a sequence of input tokens that represent a query and generate a sequence of output tokens that represent a response to the query. For a translation task, the transformer model may receive a sequence of input tokens that represent a paragraph in German and generate a sequence of output tokens that represents a translation of the paragraph or sentence in English. For a text generation task, the transformer model may receive a prompt and continue the conversation or expand on the given prompt in human-like text.

When the machine-learned model is a language model, the sequence of input tokens or output tokens are arranged as a tensor with one or more dimensions, for example, one dimension, two dimensions, or three dimensions. For example, one dimension of the tensor may represent the number of tokens (e.g., length of a sentence), one dimension of the tensor may represent a sample number in a batch of input data that is processed together, and one dimension of the tensor may represent a space in an embedding space. However, it is appreciated that in other embodiments, the input data or the output data may be configured as any number of appropriate dimensions depending on whether the data is in the form of image data, video data, audio data, and the like. For example, for three-dimensional image data, the input data may be a series of pixel values arranged along a first dimension and a second dimension, and further arranged along a third dimension corresponding to RGB channels of the pixels.

In one embodiment, the language models are large language models (LLMs) that are trained on a large corpus of training data to generate outputs for the NLP tasks. An LLM may be trained on massive amounts of text data, often involving billions of words or text units. The large amount of training data from various data sources allows the LLM to generate outputs for many tasks. An LLM may have a significant number of parameters in a deep neural network (e.g., transformer architecture), for example, at least 1 billion, at least 15 billion, at least 135 billion, at least 175 billion, at least 500 billion, at least 1 trillion, or at least 1.5 trillion parameters.

Since an LLM has significant parameter size and the amount of computational power for inference or training the LLM is high, the LLM may be deployed on an infrastructure configured with, for example, supercomputers that provide enhanced computing capability (e.g., graphic processor units) for training or deploying deep neural network models. In one instance, the LLM may be trained and deployed or hosted on a cloud infrastructure service. The LLM may be pre-trained by the data analytics system 140 or one or more entities different from the data analytics system 140. An LLM may be trained on a large amount of data from various data sources. For example, the data sources include websites, articles, posts on the web, and the like. From this massive amount of data coupled with the computing power of LLM's, the LLM is able to perform various tasks and synthesize and formulate output responses based on information extracted from the training data.

In one embodiment, when the machine-learned model including the LLM is a transformer-based architecture, the transformer has a generative pre-training (GPT) architecture including a set of decoders that each perform one or more operations to input data to the respective decoder. A decoder may include an attention operation that generates keys, queries, and values from the input data to the decoder to generate an attention output. In another embodiment, the transformer architecture may have an encoder-decoder architecture and includes a set of encoders coupled to a set of decoders. An encoder or decoder may include one or more attention operations.

While a LLM with a transformer-based architecture is described as a primary embodiment, it is appreciated that in other embodiments, the language model can be configured as any other appropriate architecture including, but not limited to, long short-term memory (LSTM) networks, Markov networks, BART, generative-adversarial networks (GAN), diffusion models (e.g., Diffusion-LM), and the like.

In one embodiment, the task for the model serving system 150 is based on knowledge of the data analytics system 140 that is fed to the machine-learned model of the model serving system 150, rather than relying on general knowledge encoded in the model weights of the model. Thus, one objective may be to perform various types of queries on the external data in order to perform any task that the machine-learned model of the model serving system 150 could perform. For example, the task may be to perform question-answering, text summarization, text generation, and the like based on information contained in an external dataset.

Thus, in one embodiment, the data analytics system 140 is connected to an interface system 160. The interface system 160 receives external data from the data analytics system 140 and builds a structured index over the external data using, for example, another machine-learned language model or heuristics. The interface system 160 receives one or more queries from the data analytics system 140 on the external data. The interface system 160 constructs one or more prompts for input to the model serving system 150. A prompt may include the query of the user and context obtained from the structured index of the external data. In one instance, the context in the prompt includes portions of the structured indices as contextual information for the query. The interface system 160 obtains one or more responses from the model serving system 150 and synthesizes a response to the query on the external data. While the data analytics system 140 can generate a prompt using the external data as context, often times, the amount of information in the external data exceeds prompt size limitations configured by the machine-learned language model. The interface system 160 can resolve prompt size limitations by generating a structured index of the data and offers data connectors to external data sources.

Figure 1B:
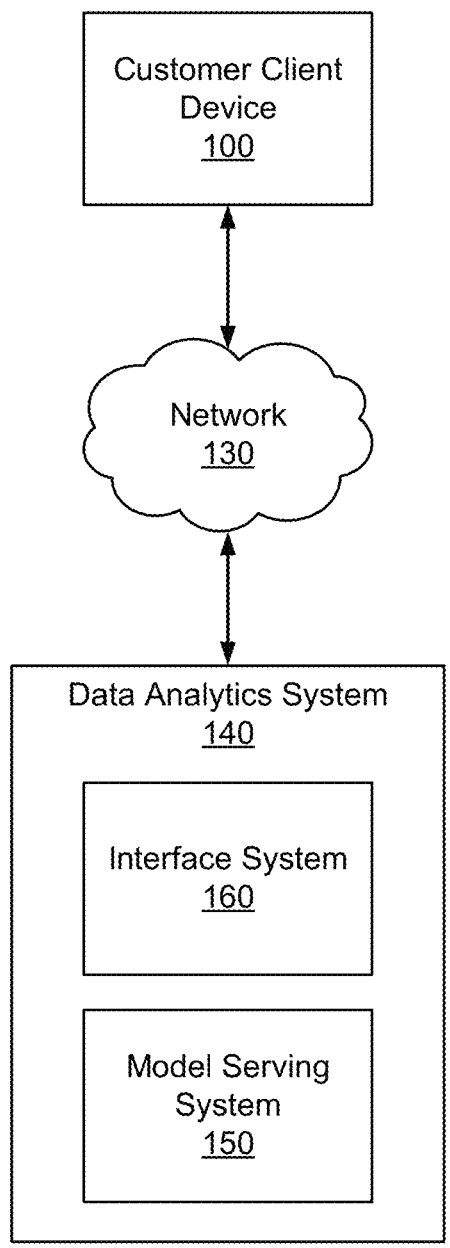
FIG. 1B illustrates an example system environment for a data analytics system, in accordance with one or more embodiments.

FIG. 1B illustrates an example system environment for a data analytics system 140, in accordance with one or more embodiments. The system environment illustrated in FIG. 1B includes a client device 100, a network 130, and a data analytics system 140. Alternative embodiments may include more, fewer, or different components from those illustrated in FIG. 1B, and the functionality of each component may be divided between the components differently from the description below. Additionally, each component may perform their respective functionalities in response to a request from a human, or automatically without human intervention.

The example system environment in FIG. 1A illustrates an environment where the model serving system 150 and the interface system 160 is managed by a separate entity from the data analytics system 140. In one embodiment, as illustrated in the example system environment in FIG. 1B, the model serving system 150 or the interface system 160 are managed and deployed by the entity managing the data analytics system 140.

Matrix User Interface

A data analytics system provides a matrix user interface whereby a user can run multiple prompts across multiple sources at the same time and view the results in an organized manner. The matrix user interface improves the application of LLMs to analyze large quantities of data and to display the information in a human-understandable format. Example system environments for the data analytics system are described with regards to FIGS. 1A and 1B.

The description herein may refer to the data analytics system interacting with a LLM. As noted above, the data analytics system may interact with the LLM by interfacing with a third-party model serving system that hosts the LLM or the data analytics system may host the LLM and interact with it directly. Additionally, the data analytics system may interface with an agent system that leverages the LLM to perform tasks autonomously or semi-autonomously. Specifically, the agent system may leverage the capabilities of the LLM, often in combination with other tools, to perform specific actions, make decisions, and interact with its environment or users. The data analytics system may interface with the LLM through an agent system operating as part of the data analytics system or may interface with a third-party agent system.

FIG. 2 illustrates an example matrix user interface, in accordance with some embodiments. A matrix user interface is a user interface that displays sources 200 and column prompts 210 in a grid or spreadsheet format to allow a user to execute column prompts 210 across a set of sources 200. Each row 220 corresponds to a source and each column 230 corresponds to a column prompt 210 provided by a user to be applied to each of the sources 200 in the rows 220. The cells 240 contain the output of the column prompt 210 of the corresponding column 230 as applied to the source 200 of the corresponding row 220. The matrix user interface may include a user interface element that causes the data analytics system to generate the contents of the cells of the matrix user interface. An example method for generating contents for the cells is described in further detail below with regards to FIG. 4.

A source, as used herein, is a unit of data that the data analytics system takes as input and to which column prompts are applied. For example, a source may be a file, set of files, or a database. In some embodiments, a source is a webpage or website. A source may include raw data from the user such as text or images in line, or many different types of files, such as document files, code files, audio files, video files, compressed files, executable files, spreadsheet files, or web files. Sources may be uploaded to the data analytics system direct and stored there. Alternatively, the user device may provide the data analytics system with locator information describing the location from which the data analytics system may retrieve the source, such as a third-party data storage system.

In some embodiments, the matrix user interface displays information stored in a grid-based data structure. A grid-based data structure is a data structure or database that stores the results of column prompts applied to sources. The grid-based data structure may store the results in a relational manner, such as the grid illustrated in the matrix user interface. The generation of a grid-based data structure is described in further detail below with regards to FIG. 4.

In some embodiments, the data analytics system may collapse the rows of the matrix user interface that correspond to sources together and display a single cell for each prompt for the set of collapsed rows. The data analytics system may select an output for each prompt based on each source in the displayed row/column. For example, if the matrix user interface has a prompt asking for the earliest date that an event occurred (e.g., that two people spoke to each other), the data analytics system may compare the outputs for each cell in the column of that prompt and display, in the collapsed row, the output with the earliest date of all of the cells. The data analytics system may prompt a generative model (e.g., an LLM) to compare the outputs of the cells to identify the cell with the output that is most responsive to the prompt or to generate a new output for the cell (e.g., using an LLM) of the collapsed row based on the outputs of the cells in the collapsed rows.

Figure 3:
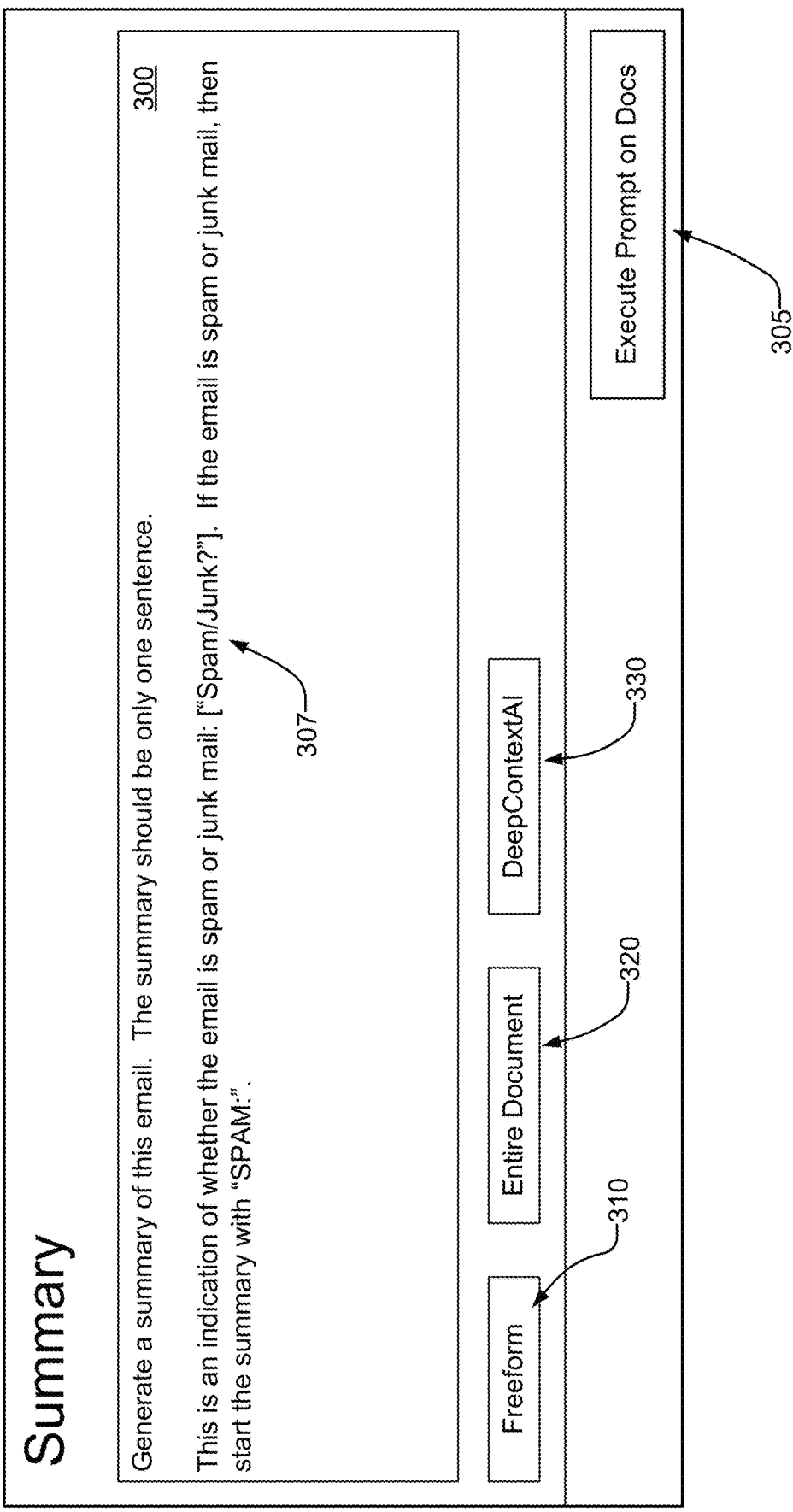
FIG. 3 illustrates an example prompt user interface whereby a user can input a column prompt, in accordance with some embodiments.

The user can select a user interface element 250 to edit the prompt of a column to be applied to the sources. FIG. 3 illustrates an example prompt user interface whereby a user can input a column prompt, in accordance with some embodiments. This prompt user interface may be overlaid on top of the matrix user interface illustrated in FIG. 2 or may be presented as a separate page or window from the matrix user interface.

The user can input the column prompt 300 as free text in a text box. The column prompt 300 is a prompt for the data analytics system to apply to each of the documents in the rows of the matrix user interface. Specifically, the data analytics system prompts an LLM to generate a response based on the text of the column prompt 300 and based on part or all of a document. The prompt user interface may include an element 305 that causes the data analytics system to apply the column prompt to the documents in the matrix user interface.

In some embodiments, the column prompt is generated by the data analytics system. For example, the data analytics system may store libraries of pre-generated prompts that users can select for column prompts. Alternatively, the data analytics system may automatically generate prompts for the columns based on documents that the user has selected or based on a query that the user has provided to the data analytics system. The prompt user interface may also allow the user to edit these pre-generated prompts using the text box. The generation of prompts for users is described in further detail below with regards to FIG. 8.

Furthermore, the column prompt may include references 307 to other columns in the grid-based data structure. The references 307 may include specific characters that the data analytics system interprets as referring to a column in the grid-based data structure rather than as text to include in the prompt. In some embodiments, the prompt user interface allows the user to select a cell or set of cells whose output should be used in a prompt and the data analytics system automatically generates the specific characters to refer to the selected cells. When prompting the LLM using the column prompt, the data analytics system may replace the reference with the text of a cell in the referenced column within the same row. In some embodiments, the reference 307 can reference to a cell in a different row from the column prompt containing the reference 307.

The prompt user interface also includes other UI elements that allow for a user to set certain parameters related to the prompt. For example, the prompt interface may include an element 310 that specifies as how the LLM should format the output. The data analytics system may, based on the format selection element 310, specify additional instructions to include in prompts to an LLM specifying an output or apply certain post-processing techniques to the LLM output in accordance with the selected format.

Additionally, the prompt user interface may also include an element 320 for specifying whether to analyze the entire document or only a portion of the document. Furthermore, the prompt user interface may include an element 330 for setting parameters for the LLM's generation of a response. For example, the user may use the element 330 to select which LLM to use for the column prompt or parameters for prompting the LLM, such as the temperature or max token size for the output.

In some embodiments, sources in the rows identify content for the data analytics system to pull from online systems and the data analytics system applies the column prompts to the content retrieved from those systems. For example, a source may identify a third-party database that stores content that is available for retrieval from that database. The source may specify parameters to use for retrieving the content. For example, if the third-party database stores information about corporate entities, the source may specify a stock ticker for a corporate entity whose information the data analytics system should retrieve. The data analytics system may pull that information from the online system and use that information as the source content for generating a grid-based data structure.

Furthermore, the terms "row" and "column" are used herein to refer to different axes or dimensions of a two-dimensional grid or matrix, and prompts and documents may be aligned along either of these dimensions. For example, prompts that correspond to different columns may be aligned vertically or horizontally in a matrix user interface. Similarly, documents that correspond to rows may be aligned horizontally or vertically. In some embodiments, the matrix user interface may include an option for a user to switch how prompts and sources are displayed in the matrix user interface.

Generating a Grid-Based Data Structure

Figure 4:
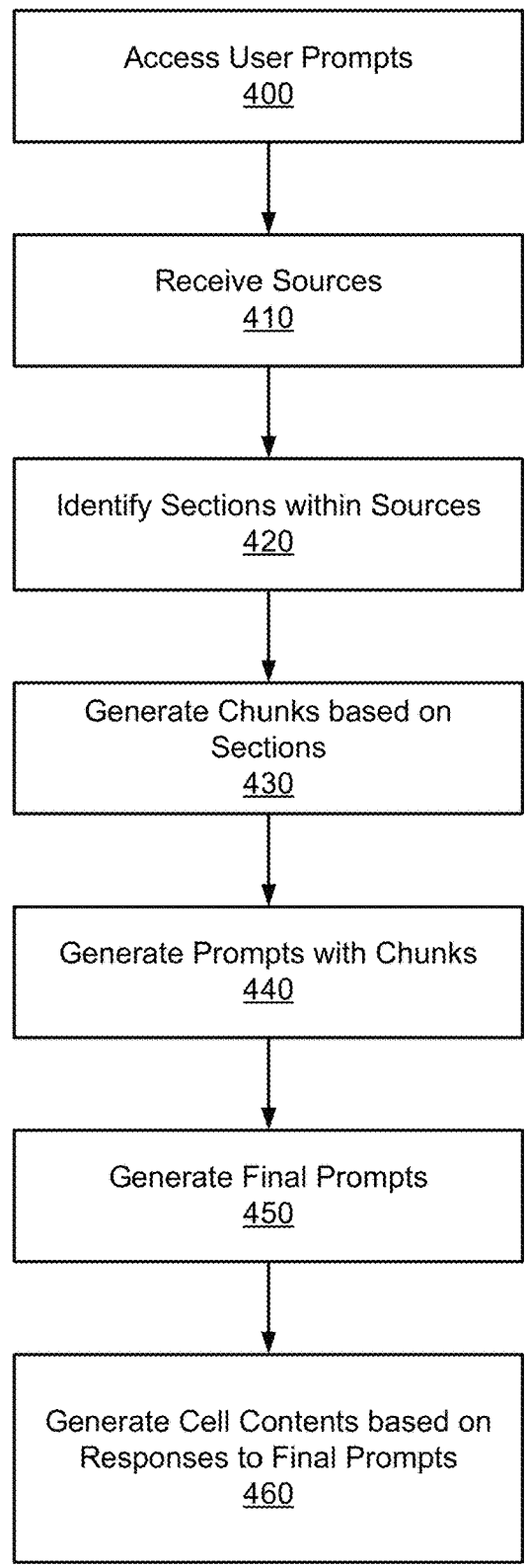
FIG. 4 is a flowchart for an example method for generating a grid-based data structure, in accordance with some embodiments.

FIG. 4 is a flowchart for an example method for generating a grid-based data structure, in accordance with some embodiments. Alternative embodiments may include more, fewer, or different steps from those illustrated in FIG. 4, and the steps may be performed in a different order from that illustrated in FIG. 4. These steps may be performed by an online system (e.g., data analytics system 140) or a client device (e.g., client device 100). Additionally, each of these steps may be performed automatically without human intervention.

The data analytics system accesses 400 a set of column prompts. As described above, the column prompts are free text that include instructions for an LLM for generating a response. The data analytics system may receive the column prompts through a prompt user interface, may store a library of column prompts that a user can use, or may automatically generate the column prompts based on a query from the user.

The data analytics system receives 410 sources from a user on which to perform the prompt. The data analytics system may receive the sources from a client device through which the user interacts with the data analytics system (e.g., through a client application or a web browser). The data analytics system also may receive the sources from an external system (e.g., a third-party system) that stores documents on behalf of the user, such as a cloud storage system or file management system.

In some embodiments, the data analytics system pre-processes the received sources. For example, the data analytics system may extract metadata from the sources, such as the name of the source, author(s) of the source, a date the source was created or last modified, the size of the source, or a type of the source. The data analytics system may also identify and extract non-text data in the sources, such as images, graphs, audio, or video. In some embodiments, the data analytics system extracts text from these non-text data. For example, the data analytics system may apply algorithms or machine-learning models to the non-text data that extract text from that data, such as text-to-speech or optical character recognition. The data analytics system also may pre-process sources by converting sources of different types into a common type or format.

To generate the output for the cells of the grid-based data structure, the data analytics system applies each column prompt to each received source. In some embodiments, the data analytics system generates an LLM prompt that contains the text from the column prompt and data from the source. For example, the LLM prompt may include the text of the source or, where the LLM is multi-modal, may include images or other data types contained in the source. The data analytics system may simply use the response from this LLM prompt as the output for the cell corresponding to the source and column prompt.

However, since LLM's commonly have limited context windows, the data analytics system may need to provide the data in a source in separate prompts, rather than all in one prompt. To do so, the data analytics system identifies 420 sections within each of the received sources. The identified sections within a source are discrete portions of the source that are designated as separate portions according to the structure of the source itself. For example, sections may be sentences, paragraphs, or chapters within a text document, the contents of a table or graph, or an image within the source. The data analytics system may identify the sections of a source by parsing it to generate text and other data from the document. The data analytics system may perform different parsing flows depending on the type of the source. For example, the data analytics system may perform an optical character recognition (OCR) analysis on documents without embedded text (e.g., images). The data analytics system also may use computer-vision models to detect the layout of tables or graphs in the documents to extract the data from those figures as well. In some embodiments, the data analytics system uses a multimodal LLM to parse the documents or to directly infer the sections of the document based on a visual representation of a document.

The data analytics system generates 430 chunks of received sources based on the identified sections. A chunk is one or more contiguous sections that contain content that relates to each other. For example, a chunk may contain a set of consecutive paragraphs that describe the same topic. The data analytics system may use an LLM to semantically split chunks. For example, the data analytics system may prompt an LLM with the source to identify natural break points in the source. For example, the prompt may instruct the LLM to identify anchor quotes in the source that come at the end of a set of semantically consistent sections, such as at the end of sentences or paragraphs. The data analytics system splits the text at each identified break point to generate the chunks.

Similarly, the data analytics system may use an embedding model to discriminatively semantically split sources. For example, the data analytics system may apply an embedding model to each of the identified sections to generate an embedding describing each section. The data analytics system may iteratively compare section embeddings through the sequence of sections in a source and designate the end of a chunk when the difference between the embeddings of two sections exceeds a threshold value. For example, the data analytics system may start a new chunk when the distance or cosine similarity between successive chunk embeddings exceeds some threshold value.

Figure 5A:
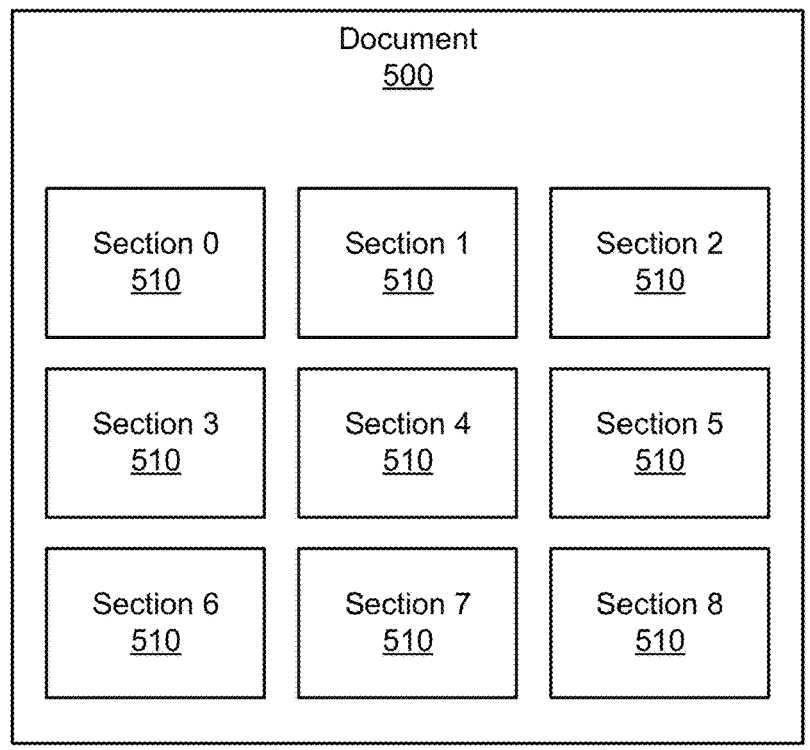
FIGS. 5A and 5B illustrate how a document with sections is separated into chunks, in accordance with some embodiments.
Figure 5B:
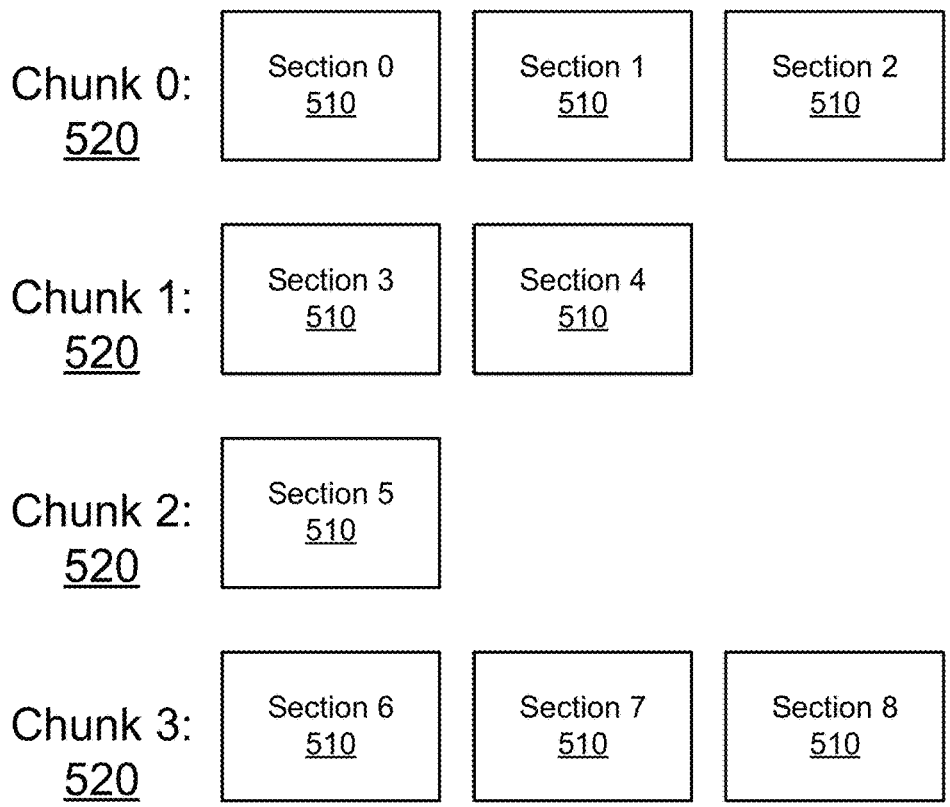

FIGS. 5A and 5B illustrate how a source 500 with sections 510 is separated into chunks 520, in accordance with some embodiments. As noted above, each section 510 is a portion of the overall source 500, and each chunk 520 contains one or more consecutive sections 510 that are semantically related to each other.

The data analytics system generates 440 a set of context window prompts for a source based on the generated chunks. Each context window prompt includes a subset of the generated chunks and a column prompt to be applied to the text in the subset of chunks. Each context window prompt also includes instructions to the LLM to generate a response to the column prompt based on the information in the subset of chunks. In some embodiments, the context window prompts include information extracted from the sources through pre-processing of the sources. For example, the context window prompt may include metadata extracted from the sources or may include text extracted from non-text data within the sources.

Figure 6:
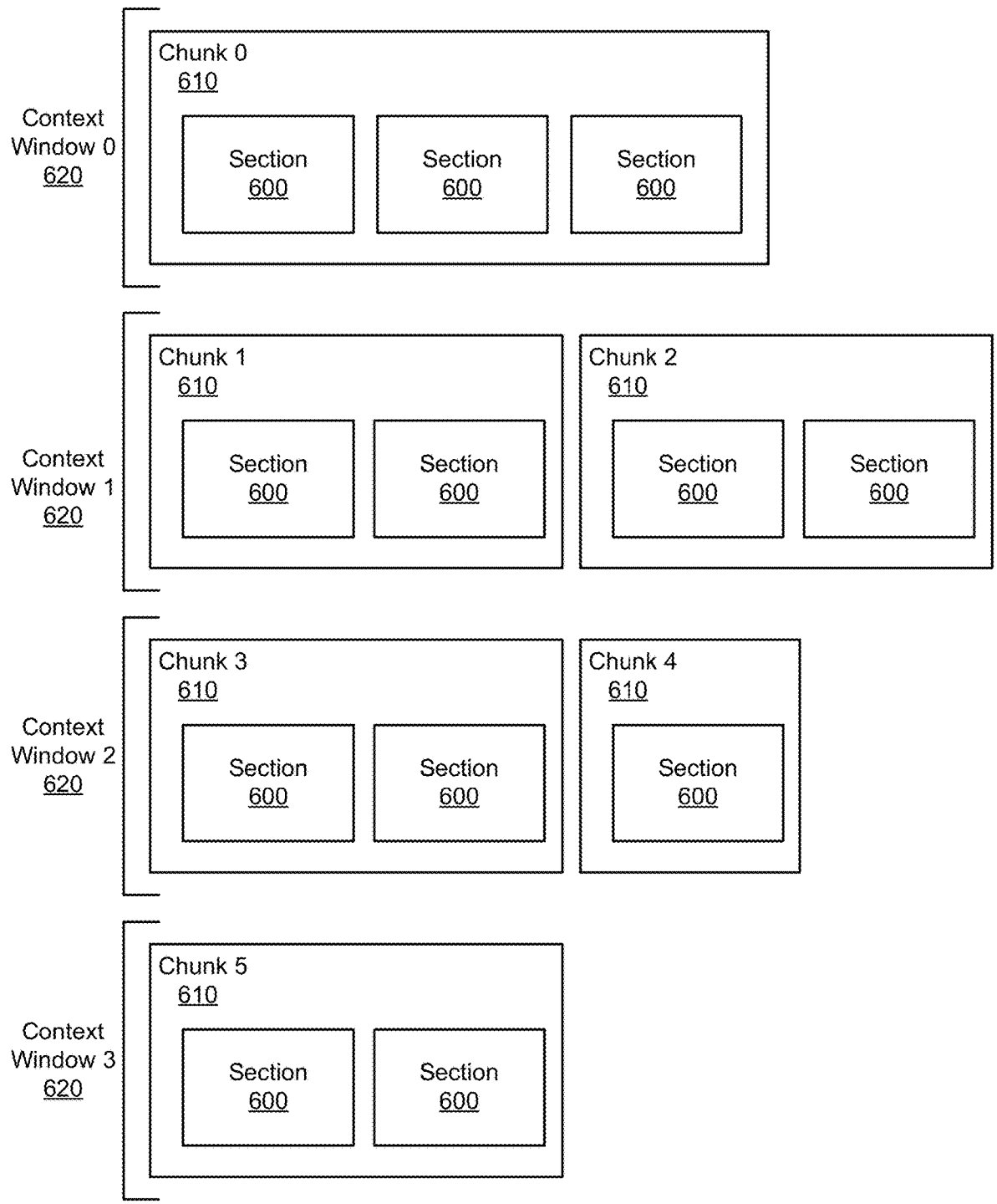
FIG. 6 illustrates how chunks with different sections may be divided into context windows, in accordance with some embodiments.

The data analytics system selects which chunks to include in each context window prompt based on the context window of the LLM being applied to the context window prompts. For example, the data analytics system may select unique subsets of the generated chunks, where each subset has a cumulative size below some threshold that is based on the context window of the LLM (e.g., some threshold fraction of the token limit of the LLM). The data analytics system may generate these unique subsets by iteratively identifying sequential sets of chunks within a source that fit within the threshold limit. The data analytics system generates a context window prompt for each of the subsets and transmits the context window prompt to the LLM to receive a response for each content window prompt. FIG. 6 illustrates how chunks 610 with different sections 600 may be divided into context windows 620, in accordance with some embodiments. Each of these subsets of chunks in these context windows 620 may be used for a context window prompt.

In some embodiments, the data analytics system filters the generated chunks for a source and only generates context window prompts with those chunks that are relevant to the column prompt. For example, the data analytics system may perform a semantic search on a source using the column prompt to identify the chunks of the document that are relevant to the column prompt. To perform this search, the data analytics system may generate an embedding for the column prompt and may compare that embedding to embeddings generated for the sections of source to score the relevance of each of the sections. The data analytics system may then generate a score for each chunk based on the relevance scores of the sections that make up the chunk, and may rank the chunks based on their relevance scores. The data analytics system may use the ranking to select which chunks of the source to include in the context window prompt to the LLM (e.g., selecting the top n chunks). Similarly, the data analytics system may identify chunks with relevance scores that exceed some threshold value and generate context window prompts based on the chunks that meet that threshold.

The data analytics system receives responses from the LLM to the generated prompts and generates 450 a final prompt based on the received responses. The final prompt includes the responses to each of the prompts. The final prompt also may include information describing the sections or chunks that were used to generate each response. For example, the online system may include a summary of the sections or chunks used for each response or may include embeddings describing the sections or chunks. The final prompt also includes the column prompt that was used to generate the responses. The data analytics system transmits the final prompt to the LLM with instructions to generate a response to the column prompt based on the other responses. The data analytics system receives a response from the LLM and the data analytics system uses the response to populate the corresponding cell in the grid-based data structure.

Figure 7:
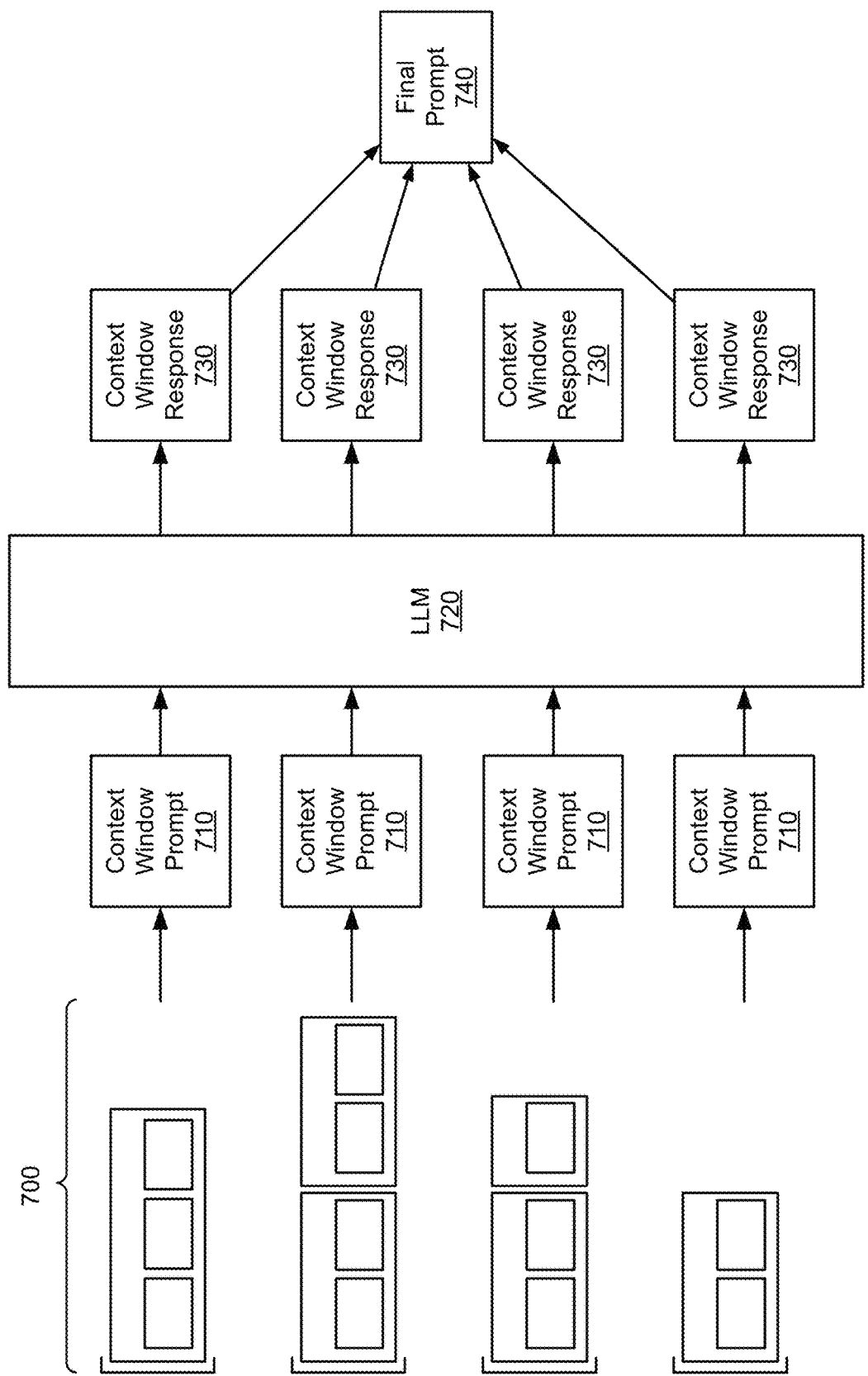
FIG. 7 illustrates an example data flow for generating a final prompt for a cell, in accordance with some embodiments.

FIG. 7 illustrates an example data flow for generating a final prompt for a cell, in accordance with some embodiments. The data analytics system uses the sets of sequential chunks 700 that correspond to context windows to generate prompts 710 for each context window. The data analytics system transmits the context window prompts 710 to an LLM 720 which generates a response 730 for each context window prompt. The data analytics system combines these context window responses 730 into the final prompt 740 for the cell. The data analytics system transmits the final prompt 740 to the LLM 720 and uses the LLM's response to the final prompt 740 to generate an output for the cell.

The data analytics system performs this process to generate 460 the contents for each cell of the grid-based data structure. In some embodiments, to save computing resources for the LLM and to thereby receive quicker responses, the data analytics system applies multiple column prompts to a document at the same time to generate the output for multiple cells in a row in one run. For example, the data analytics system may generate LLM prompts or context window prompts that include multiple column prompts from multiple columns and have the LLM apply those multiple prompts to the same document at the same time. The data analytics system parses the response from the LLM to generate the response to each of the multiple prompts out of the single response from the LLM, and outputs each response to the corresponding cell in the matrix user interface for display to the user. In some embodiments, the data analytics system selects which prompts to run together based on how related the column prompts are to each other. For example, the data analytics system may compare keywords or embeddings for each prompt to generate scores that represent how similar column prompts are to each other. The data analytics system may combine column prompts together based on those that are similar to each other and may use the similar prompts in the same run.

Similarly, the data analytics system may apply a column prompt to multiple sources at the same time by applying the same prompt (or prompts) to those documents in one run. For example, similar to running multiple prompts at once, the data analytics system may generate a single LLM prompt based on multiple sources and parse the response to that single prompt for each of the cells corresponding to each of the sources. The data analytics system may identify sources that are sufficiently similar to each other to be analyzed together in a single prompt. For example, the data analytics system may compare metadata for each source or embeddings generated based on each source to identify similar sources and thereby identify sources to include in the same prompt to the LLM. In some embodiments, the data analytics system computes similarity scores for sources by comparing embeddings for the sources and selects sources to include together in a prompt if the similarity scores exceed a threshold. The data analytics system may also include some rules or restrictions on which sources can be combined. For example, the data analytics system may limit the combined length of the sources to ensure that all sources can fit within a context window for an LLM.

In some embodiments, the data analytics system caches cell output values and uses the cached values when the same column prompt is applied to the same source. For example, the data analytics system may store cell output values in association with the column prompt and the source. In some embodiments, the data analytics system hashes the column prompt and the source (or source identification information) to associate the cell output value with the prompt and source in a database. Before prompting an LLM using a column prompt and a source, the data analytics system may check whether the column prompt has already been applied to that source. If so, the data analytics system may use the cached cell value for the grid-based data structure.

Pre-Generated Prompts and Automated Prompt Generation

The data analytics system may automatically generate column prompts for a grid-based data structure. For example, the data analytics system may store pre-generated column prompts and may provide a user interface allowing a user to select from the pre-generated column prompts to be added as a column to the grid-based data structure. The pre-generated column prompts may include prompts that a user can add to the grid-based data structure. The pre-generated column prompts also may include prompt templates that include fields for a user to complete. For example, the pre-generated column prompts may include general instructions that describe what output should be generated by the LLM or how to analyze the source, but may include fields where a user can add specific pieces of information for the LLM to extract or determine from the source. In some embodiments, the user can edit any portion of the pre-generated prompts using the prompt user interface.

In some embodiments, the data analytics system may provide pre-generated output for certain pre-generated column prompts. For example, the data analytics system may store a set of commonly used column prompts that users may ask for, such as for the data analytics system to identify the title or date of a document. The data analytics system may automatically generate the output for these prompts and include columns for those prompts with the corresponding outputs in the grid-based data structure. The data analytics system may automatically use an LLM to generate the output for the cells (e.g., using the process described for FIG. 4). Alternatively, the data analytics system may generate the output based on pre-processing of sources performed at the data analytics system. For example, the data analytics system may extract metadata from the sources and automatically include columns that store certain metadata fields for sources, such as the name of the source or the date of creation of the source.

Figure 8:
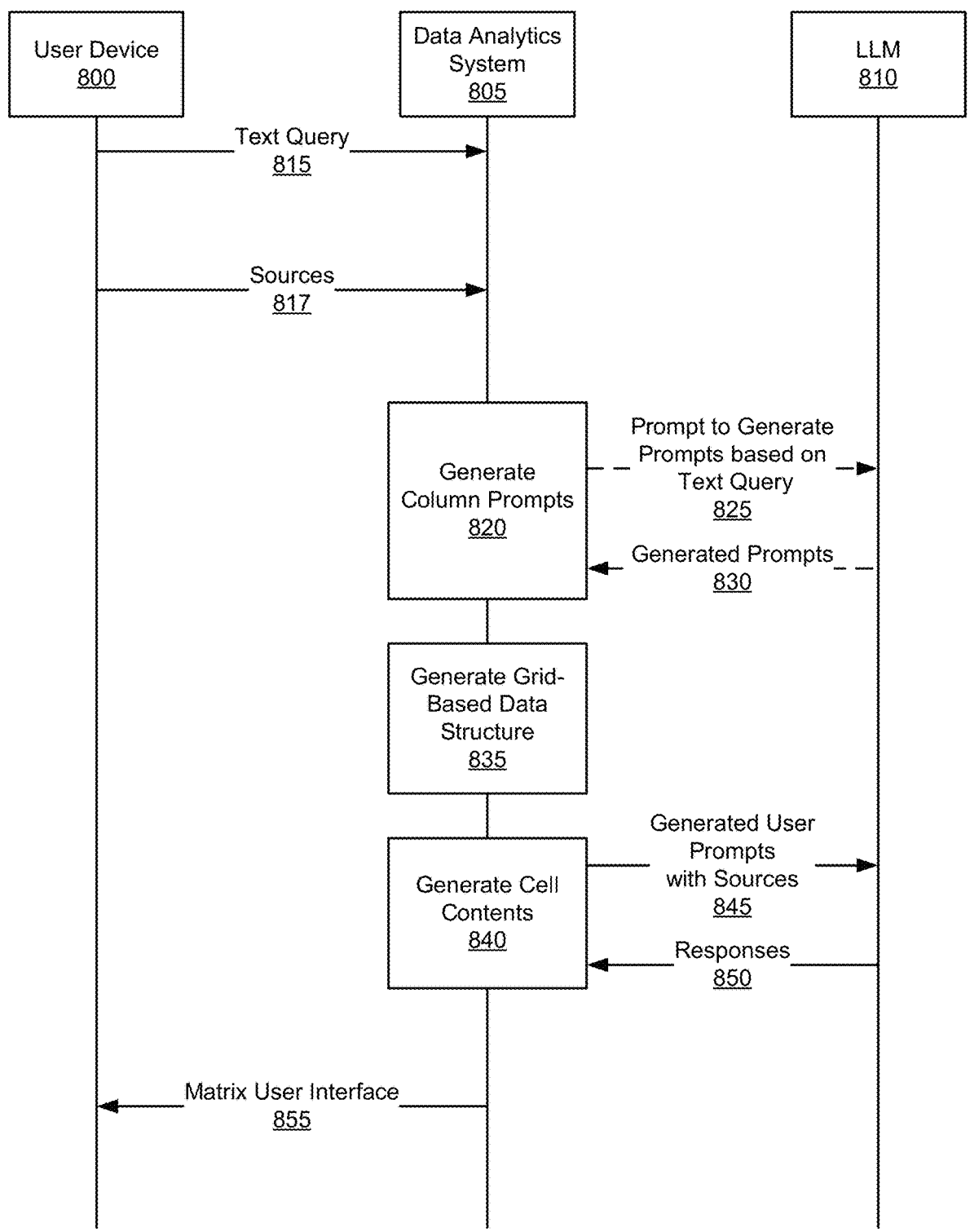
FIG. 8 illustrates an example process for automatically generating prompts based on free text queries from a user, in accordance with some embodiments.

In some embodiments, the data analytics system uses a query from a user to automatically generate prompts to apply to a set of sources. FIG. 8 illustrates an example process for automatically generating prompts based on free text queries from a user (e.g., through a chatbot user interface), in accordance with some embodiments. Alternative embodiments may include more, fewer, or different steps from those illustrated in FIG. 8, and the steps may be performed in a different order from that illustrated in FIG. 8. Furthermore, the functionality may be divided among the devices differently from that illustrated in FIG. 8.

The data analytics system 805 receives a text query 815 from a user device 800. The text query is free text from the user that indicates an intent of the user in generating a grid-based data structure or matrix user interface. For example, the user may provide a query of "Generate a matrix that analyzes my emails to summarize them and to identify junk mail" to the data analytics system and the data analytics system may generate a matrix user interface such as the one illustrated in FIG. 2. In some embodiments, the data analytics system receives the text query through a chat interface.

The data analytics system may receive a set of sources 817 along with the query 815. The query may include the sources, or the sources may be transmitted in a separate message from the text query. Additionally, the sources may be transmitted to the data analytics system directly or identifiers for the sources may be transmitted that the data analytics system can use to retrieve the sources from a data source (e.g., a database).

Figure 9A:
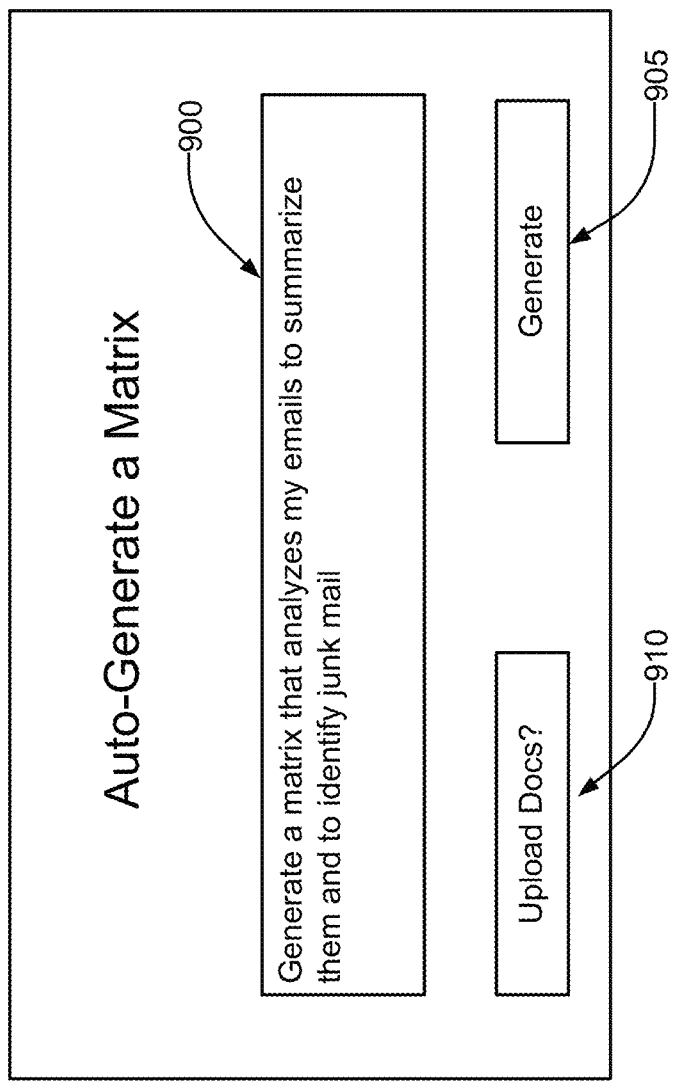
FIG. 9A is an example user interface for a user to provide a text query to the data analytics system to generate a grid-based data structure, in accordance with some embodiments.

FIG. 9A is an example user interface for a user to provide a text query to the data analytics system to generate a grid-based data structure, in accordance with some embodiments. The query user interface may be part of a matrix user interface such that an empty matrix is displayed along with the query user interface and the completed matrix is displayed when the grid-based data structure is generated. The query user interface includes a UI element 900 that allows a user to input free text for the text query and an element 905 that, when selected, causes the data analytics system to generate a grid-based data structure based on the input text query. The query user interface may further include a UI element 910 that allows the user to input sources with the free text.

The data analytics system generates 820 a set of column prompts for a grid-based data structure based on the text query. In some embodiments, the data analytics system may select a set of pre-generated prompts as the set of prompts for the grid-based structure. For example, the data analytics system may score a set of candidate pre-generated column prompts based on the text query or the set of sources and may select a subset of the pre-generated column prompts to use for the grid-based structure. The data analytics system may generate an embedding for the text query and compare that text query embedding to embeddings for each of the candidate column prompts to score the column prompts. Alternatively, the data analytics system may prompt an LLM to select a subset of the pre-generated column prompts based on the text query.

In some embodiments, the data analytics system identifies a subset of the pre-generated prompts based on the type of the text query received from the user. For example, the data analytics system may store different sets of pre-generated prompts that correspond to different types of user queries and the data analytics system may use a set of pre-generated prompts that corresponds to the type of the text query. For example, the data analytics system may store pre-generated prompts for analyzing particular types of documents, for analyzing emails, or for extracting and synthesizing information out of spreadsheets. The sets of pre-generated prompts may correspond to the topic of the text query (e.g., what question the user is hoping to have answered) or may correspond to types of sources to which the data analytics system may apply the pre-generated column prompts.

The data analytics system may identify a set of pre-generated prompts that corresponds to the text query by comparing an embedding for the text query to an embedding for each of the sets of pre-generated prompts that correspond to different types. The data analytics system may generate embeddings representing the sets of pre-generated column prompts based on embeddings for each of the prompts in each set. The data analytics system also may use a machine-learning model that is trained to identify a type for the text query based on the text query or an embedding generated based on the text query. The data analytics system may use the output from the type identification machine-learning model to identify a corresponding set of pre-generated column prompts that correspond to the text query.

The data analytics system may use the LLM 810 to identify the type of the text query. For example, the data analytics system may transmit a prompt to the LLM that includes the text query and instructions to generate an output that indicates a type of the text query. The prompt may list a set of candidate query types for the LLM to select from and may include descriptions of each type to inform the LLM's selection of a type for the text query.

In some embodiments, the data analytics system uses an LLM to generate customized column prompts for the received text query. For example, the data analytics system may generate a prompt 825 to the LLM that prompts the LLM to generate a set of customized column prompts based on the text query. In some embodiments, the prompt 825 includes instructions on a format that the customized column prompts should take in the LLM's generated response. The prompt 825 may also include sources, or information describing sources, that the generated column prompts will be applied to and the prompt 825 may include instructions to generate column prompts that would extract relevant information from those sources to respond to the received text query.

In some embodiments, the data analytics system includes a set of pre-generated prompts in the prompt 825 to the LLM as examples for the LLM to use for generating customized column prompts. As described above, the data analytics system may identify a set of pre-generated prompts that are relevant to the received text query. The data analytics system may provide these identified pre-generated prompts to the LLM with instructions to use the pre-generated prompts as examples for generating the customized column prompts.

The data analytics system receives the generated prompts 830 from the LLM in a response generated by the LLM. The data analytics system may parse the response to extract the generated prompts 830 from the LLM's response. For example, the data analytics system may use a grammar to extract generated prompts 830 of the LLM's response based on a format for the generated prompts specified in the prompt 825.

The data analytics system may use the prompts selected by the LLM to automatically set up a matrix user interface with the selected prompts. The data analytics system may also prompt the LLM to generate additional column prompts that may be used, and the data analytics system may include the column prompts generated by the LLM in the grid-based data structure. The user can add sources to the grid-based data structure with the generated column prompts through a matrix user interface. In some embodiments, the data analytics system presents the generated column prompts as recommendations for the user to add to the grid-based data structure.

The data analytics system generates 835 a grid-based data structure based on the generated column prompts and generates 840 the contents for the cells in the grid-based data structure. The data analytics system generates the cell contents by applying 845 the generated column prompts to the received sources and receiving responses 850 to those prompts. An example method for generating cell contents for a grid-based data structure is described above with regards to FIG. 4.

The data analytics system may transmit a matrix user interface 855 to the user device 800 for display to the user. The matrix user interface displays the grid-based data structure and the generated cell contents. The data analytics system also may use the grid-based data structure to generate other content, such as to generate responses to user messages in a chat interface or to generate new content items based on the contents of the cells in the grid-based data structure. Example methods for responding to messages in a chat and for generating content items based on grid-based data structures are described in further detail below.

Figure 9B:
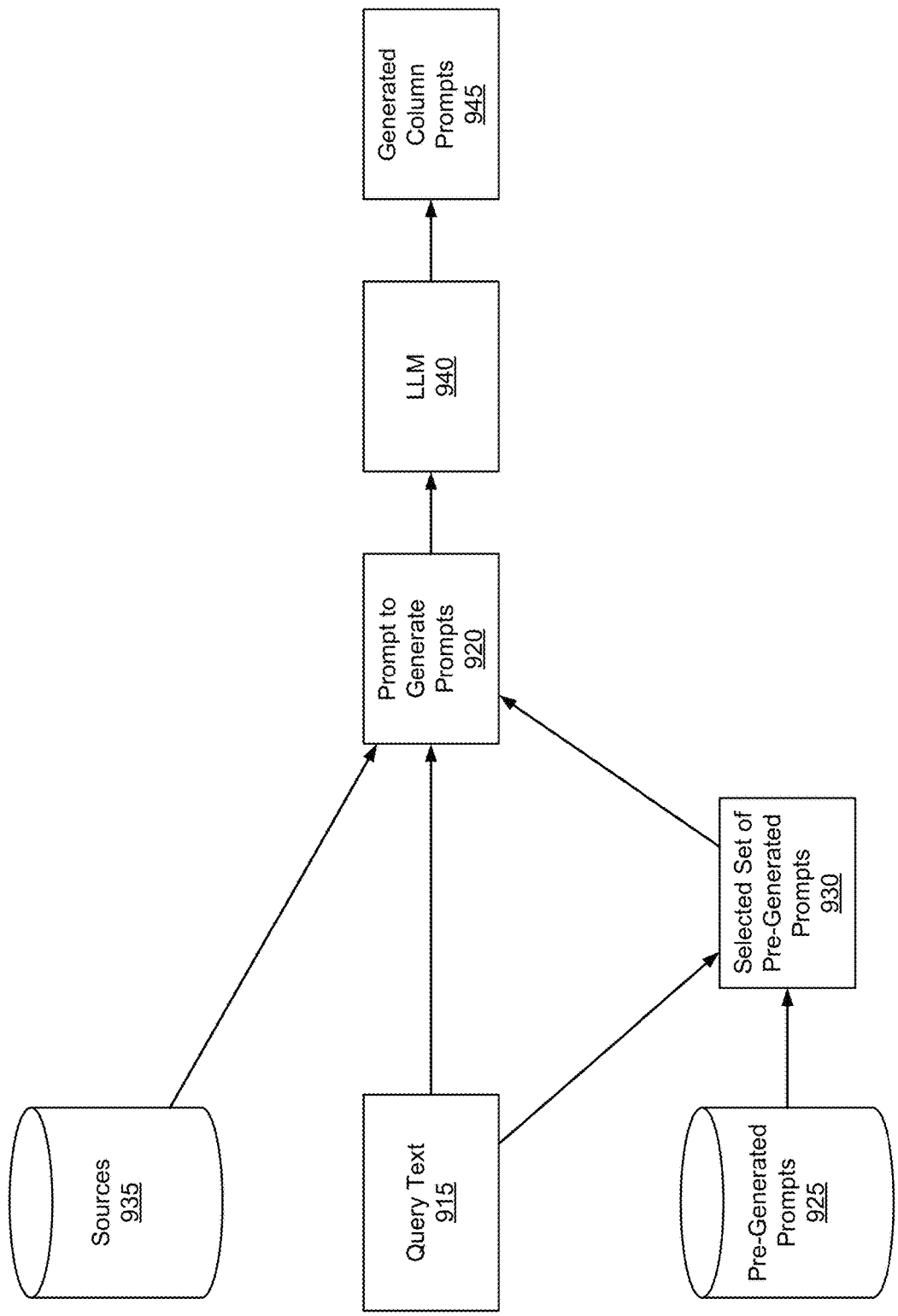
FIG. 9B illustrates an example dataflow for generating column prompts for a grid-based data structure, in accordance with some embodiments.

FIG. 9B illustrates an example dataflow for generating column prompts for a grid-based data structure, in accordance with some embodiments. The data analytics system uses the query text 915 to generate a prompt 920 to generate column prompts for a grid-based data structure. The data analytics system may store pre-generated prompts 925 and may select a subset 930 of the pre-generated prompts to include in the prompt 920 to generate prompts. In some embodiments, the data analytics system uses the query text 915 to select the subset 930 of pre-generated prompts. In some embodiments, the data analytics system includes sources 935, portions of sources, or information describing sources in the prompt 920 to generate prompts. The data analytics system inputs the prompt to generate prompts to an LLM 940 and receives a set of generated column prompts 945 from the LLM.

In some embodiments, the data analytics system automatically generates column prompts and applies the column prompts to sources without a request from a user. For example, the data analytics system may identify pre-generated column prompts that may be relevant to other column prompts already included in the grid-based data structure. Similarly, the data analytics system may prompt the LLM to generate column prompts that are related to the sources or the other column prompts in the grid-based data structure, such as through the process described above. The data analytics system may automatically apply those column prompts to sources to generate the corresponding cell values without adding the columns to the grid-based data structure. The data analytics system may present a user interface element with the option for the user to add those columns to the grid-based data structure or to generate a grid-based data structure with the cell values that the data analytics system pre-generated.

In some embodiments, the data analytics system enhances user-generated prompts using the process above. For example, the data analytics system may prompt the LLM to generate a column prompt based on the user-generated column prompt. The data analytics system may include instructions in a prompt to the LLM to improve the user-generated column prompt based on the sources or pre-generated prompts.

Chatbot Integration with Grid-Based Data Structure

The data analytics system may use a grid-based data structure to provide an improved chatbot experience for a user. Specifically, the data analytics system may use the grid-based data structure for contextual information to an LLM being used to generate responses to user messages in a chatbot.

Figure 10:
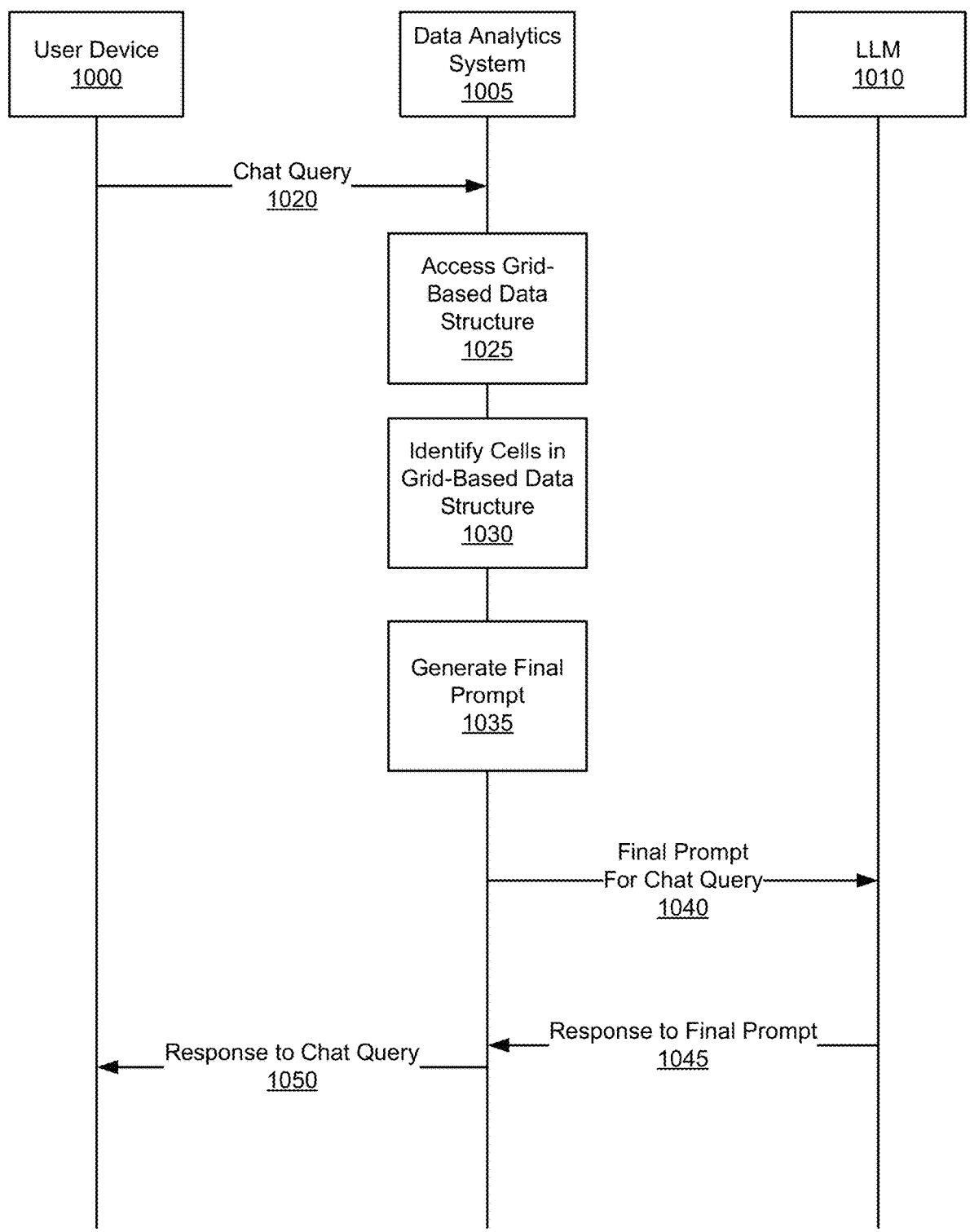
FIG. 10 is an interaction diagram illustrating an example process for responding to a user's chat query using a grid-based data structure, in accordance with some embodiments.

FIG. 10 is an interaction diagram illustrating an example process for responding to a user's chat query using a grid-based data structure, in accordance with some embodiments. Alternative embodiments may include more, fewer, or different steps from those illustrated in FIG. 10, and the steps may be performed in a different order from that illustrated in FIG. 10. Furthermore, the functionality may be divided among the devices differently from that illustrated in FIG. 10.

The data analytics system 1005 receives a chat query 1020 from the user device 1000. The chat query is free text from the user that indicates a question or request from a user. For example, the chat query may be free text describing a request from a user to provide some analysis, to perform an action, or to extract information from a set of sources. The data analytics system receives the chat query 1020 through a chat interface displayed to the user on the user device. For example, a matrix user interface displayed to a user may include a chat interface through which a user can input a chat query to the data analytics system.

FIG. 11 illustrates an example chat interface 1100, in accordance with some embodiments. The user can input a text query 1110 through a user interface element 1120 of the chat interface 1100 and the chat interface displays a response 1130 to the user's text query. The chat interface 1100 may be displayed alongside a matrix user interface 1140 that is displaying a grid-based data structure that the data analytics system may use to generate the response 1130.

The data analytics system accesses 1025 a grid-based data structure. In embodiments where the matrix user interface includes a chat interface, the data analytics system may access the grid-based data structure that is displayed in the matrix user interface. In some embodiments, the data analytics system generates the grid-based data structure based on the user's chat query. For example, the data analytics system may use the chat query like a text query for generating a grid-based data structure, such as in the example method described above with regards to FIG. 8.

The data analytics system identifies 1030 cells in the grid-based data structure that contain information relevant to the chat query. The data analytics system may filter the set of cells in the grid-based data structure based on certain criteria and use the filtered set of cells to respond to the chat query. For example, the data analytics system may filter cells based on whether column prompts are relevant to the chat query. The data analytics system may compare an embedding generated based on the chat query to embeddings generated for the column prompts to identify column prompts that are relevant to the chat query.

In some embodiments, the data analytics system generates subqueries based on the chat query. Subqueries are prompts for an LLM to generate information for responding to the chat query. For example, if the user inputs a chat query of "what proportion of my emails were spam or junk emails?", the data analytics system may generate a subquery of "how many spam or junk emails did the user receive?" The data analytics system may generate new column prompts for the grid-based data structure based on the subqueries. For example, the data analytics system may present a user interface to the user with an option to add a subquery as a new column in the grid-based data structure. In some embodiments, the data analytics system generates subqueries through a process similar to how a data analytics system may generate new prompts for a grid-based data structure.

The data analytics system applies these subqueries to the sources in the grid-based data structure. For example, the data analytics system may apply a method like that described above with regards to FIG. 4 to generate a response for each subquery.

The data analytics system may filter cells based on their corresponding sources. For example, the data analytics system may identify sources that are relevant to the received chat query and filter cells based on whether their corresponding source is relevant to the chat query. In some embodiments, the data analytics system compares an embedding for the chat query to an embedding generated based on the source to determine whether the source is relevant. For example, the data analytics system may generate an embedding for the source using the source directly, or may prompt the LLM 1010 to generate a text summary of a source and generate the embedding based on that summary.

In some embodiments, the data analytics system uses an iterative source decomposition (ISD) process to generate a response to the user's query text. The ISD process may involve generating rules for selecting sources that would be useful in responding to the user's query text and generating sub-queries whose answers simplify the broader question asked by the user's query text. In some embodiments, the data analytics system performs the ISD process to generate cell values based on column prompts.

For example, to perform the ISD process, the data analytics system may identify a set of relevant sources by generating a set of rules for selecting sources. The generated set of rules constrain which sources or what portions of sources the data analytics system uses to respond to the user's query text. For example, the set of rules may include filters on source content, SQL queries to database sources, keyword or semantic searches of sources or source descriptions, or metadata filters.

The data analytics system generates the set of rules by prompting an LLM to generate the rules. For example, the data analytics system may generate a prompt to the LLM requesting that the LLM generate rules for filtering sources or portions of sources for use in responding to the chat query. The prompt may include the chat query, information describing the sources, and instructions to generate the rules. The prompt may also include instructions to generate the set of rules in a computer-executable format. For example, the prompt may include instructions to generate SQL queries to databases that get the relevant portion of a database source from that database. Similarly, the prompt may instruct the LLM to generate lists of keywords or metadata fields to be used to filter sources. In some embodiments, rather than a single prompt, the data analytics system uses more than one prompt to generate the computer-executable set of rules. For example, the data analytics system may generate a first prompt to generate a human-understandable version of the rules and may then generate a second prompt to generate the computer-readable versions.

The data analytics system extracts the rules from a response from the LLM. For example, the prompt may include instructions to the LLM on how to format the computer-executable set of rules and the data analytics system may extract the rules from the response based on the format specified in the instructions. The data analytics system applies the rules to identify sources that may be relevant to the chat query and thereby filter cells based on those identified sources.

The data analytics system uses the contents of the identified cells to generate 1035 a final prompt to the LLM to respond to the chat query. The final prompt includes the chat query and the contents of identified cells in the grid-based data structure. The final prompt also may include the results of applying the subqueries to sources in the grid-based data structure. In some embodiments, the subqueries are only applied to a subset of the sources (e.g., the subset identified through the ISD process) and only the results of applying those subqueries to those sources are included in the final prompt to the LLM. The final prompt may include additional context data for the chat query. For example, the final prompt may include user data describing the user who transmitted the chat query. The final prompt also may include a chat history describing previous chat queries and responses to those chat queries.

The data analytics system transmits the final prompt 1040 to the LLM and the LLM generates a response 1045 to the prompt that includes a response to the chat query. The data analytics system extracts the chat response from the response 1045 to the prompt and transmits the chat response 1050 to the user for presentation in the chat interface.

Figure 12A:
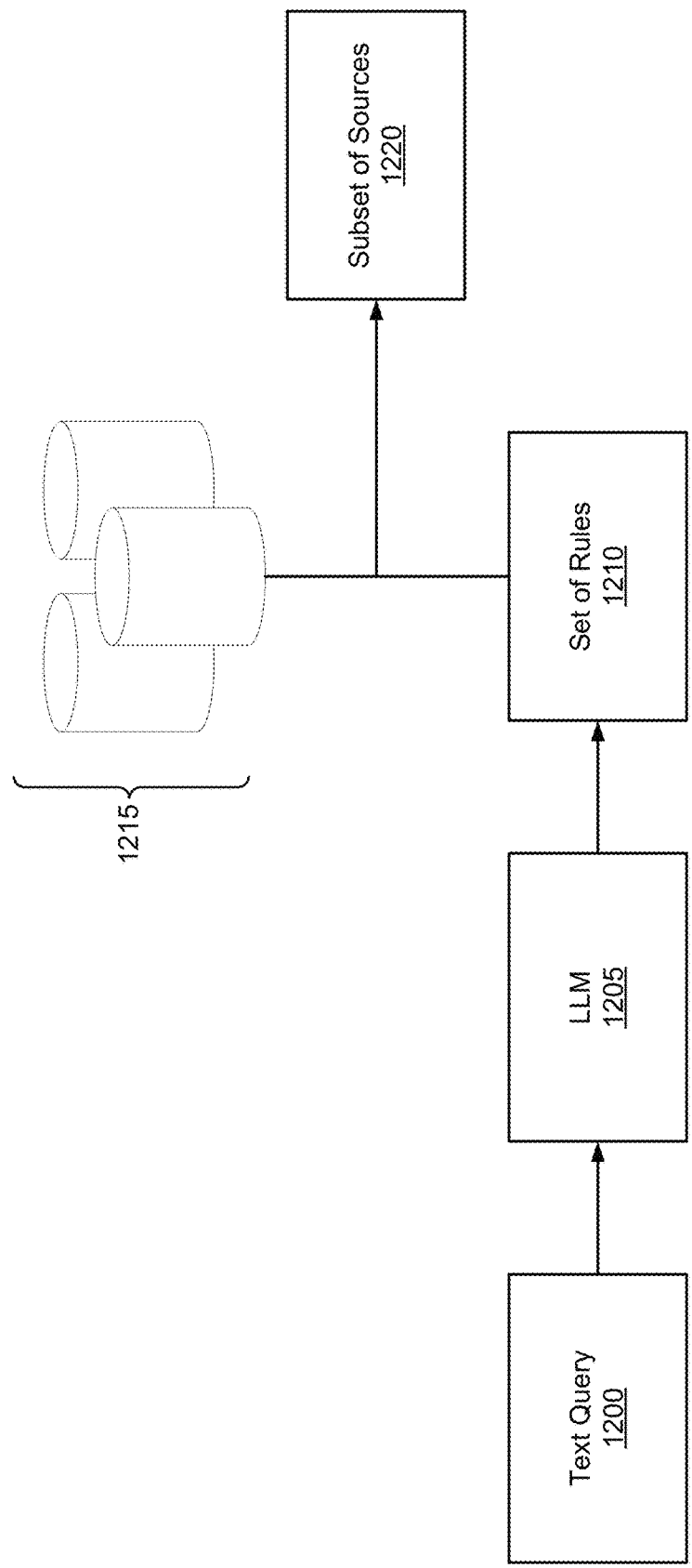
FIG. 12A illustrates an example process for generating a subset of sources based on a set of rules, in accordance with some embodiments.
Figure 12B:
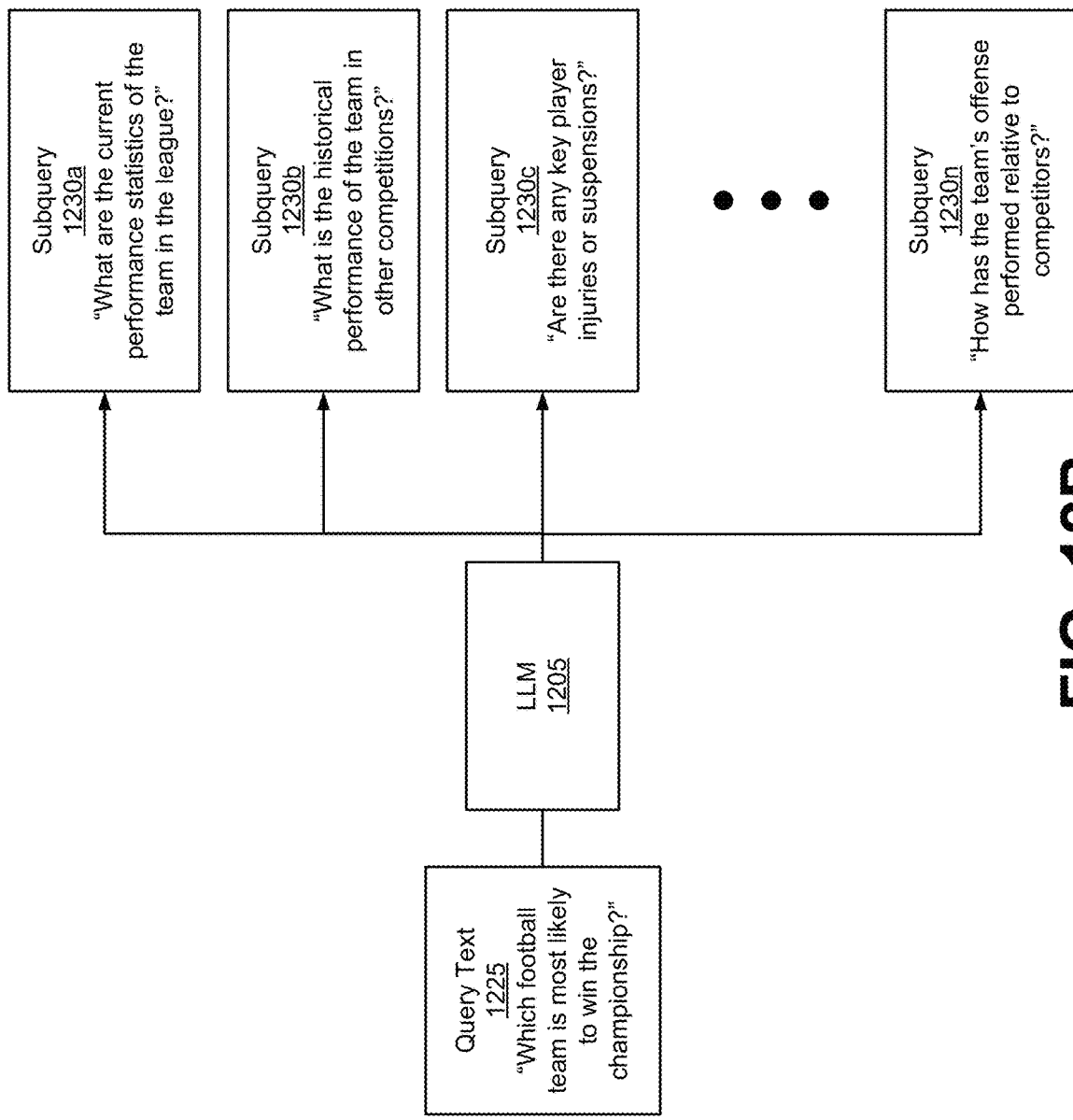
FIG. 12B illustrates an example process for generating sub-queries based on the query text included in a chat query.
Figure 12C:
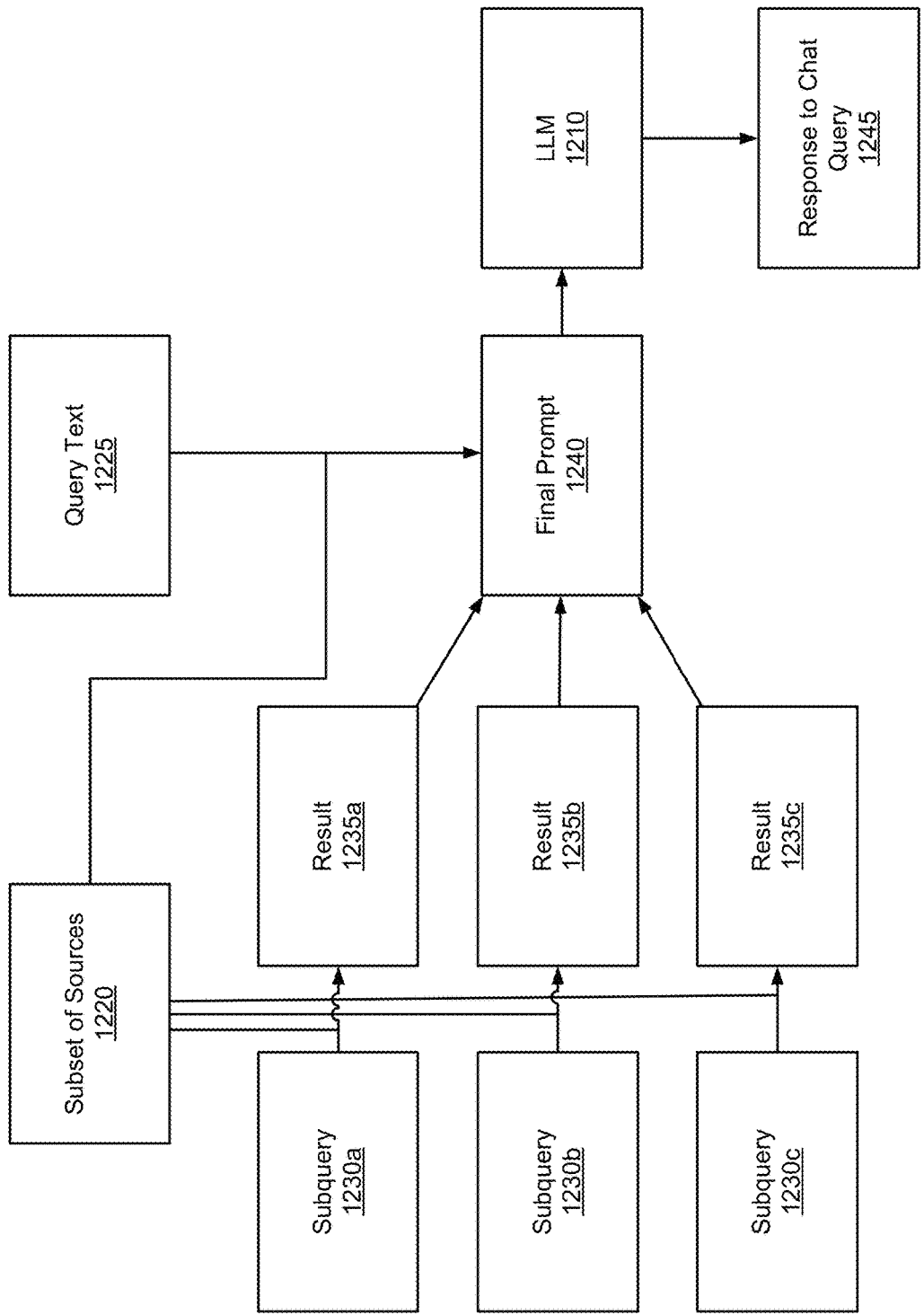
FIG. 12C illustrates how subqueries are applied to a subset of sources for generating a final prompt to respond to the chat query, in accordance with some embodiments.

FIGS. 12A-12C illustrate an example ISD process, in accordance with some embodiments. FIG. 12A illustrates an example process for generating a subset of sources based on a set of rules, in accordance with some embodiments. The data analytics system receives a chat query 1200 from a user device. The data analytics system provides the chat query 1200 to an LLM 1205 in a prompt that requests that the LLM 1205 generate a set of rules 1210 based on the chat query 1200. The data analytics system applies these rules 1210 to a set of sources 1215 to generate a subset 1220 of the set of sources.

FIG. 12B illustrates an example process for generating sub-queries based on the query text included in a chat query. The data analytics system uses the query text 1225 from the chat query to prompt the LLM 1205 to generate subqueries based on the query text 1225. In the example illustrated in FIG. 12B, the query text 1225 asks which football team is most likely to win a championship and the subqueries 1230 are questions that one might ask to determine which team is most likely to win.

FIG. 12C illustrates how subqueries are applied to a subset of sources for generating a final prompt to respond to the chat query, in accordance with some embodiments. The data analytics system applies the subqueries 1230 to the subset of sources 1220 by transmitting a prompt to the LLM using each subquery 1230 and the subset of sources 1220. In some embodiments, the data analytics system applies each subquery to each source in the subset of sources 1220. The LLM 1205 transmits results 1235 of applying the subqueries 1230 to the subset of sources 1220 to the data analytics system and the data analytics system generates a final prompt 1240 based on the results 1235. The data analytics system also may generate the final prompt 1240 based on the query text 1225 of the chat query and the subset of sources 1220. The data analytics system provides the final prompt 1240 to the LLM 1205 and the LLM 1205 generates a response 1245 to the user's chat query based on the results 1235 included in the final prompt 1240.

In some embodiments, the ISD process uses the LLM to identify portions of sources to use to respond to a chat query. For example, the data analytics system may prompt the LLM with portions of a source (e.g., sentences or paragraphs) and with the text of a chat query, and instruct the LLM to identify whether the portions (or sub portions) in the prompt are responsive to the chat query text or could help respond to the chat query text. The data analytics system may receive a response from the LLM that identifies the portions or sub portions that are responsive to the chat query. The ISD process may involve performing this step for all portions within the sources to identify the portions of the sources to use for responding to the chat query. The data analytics system may use cell values and identified portions of sources to respond to a chat query.

Content Item Generation and Cell Highlighting

In some embodiments, the data analytics system uses the grid-based data structure to generate other forms of content besides chat responses in a chat interface. For example, the data analytics system may enable a user to generate text documents, slides, spreadsheets, emails, or memoranda. The pieces of content that a data analytics system may generate using a grid-based data structure are referred to herein as "content items." Furthermore, as used herein, "content items" may include responses that the data analytics system generates in a chat interface, such as those described above with regards to FIG. 10.

The data analytics system also may use the grid-based data structure as a human-explainable and human-revisable intermediary structure in content generation. Specifically, the data analytics system may highlight cells that were most relevant to a selected portion of a content item to demonstrate how that portion of the content item was generated.

Figure 13:
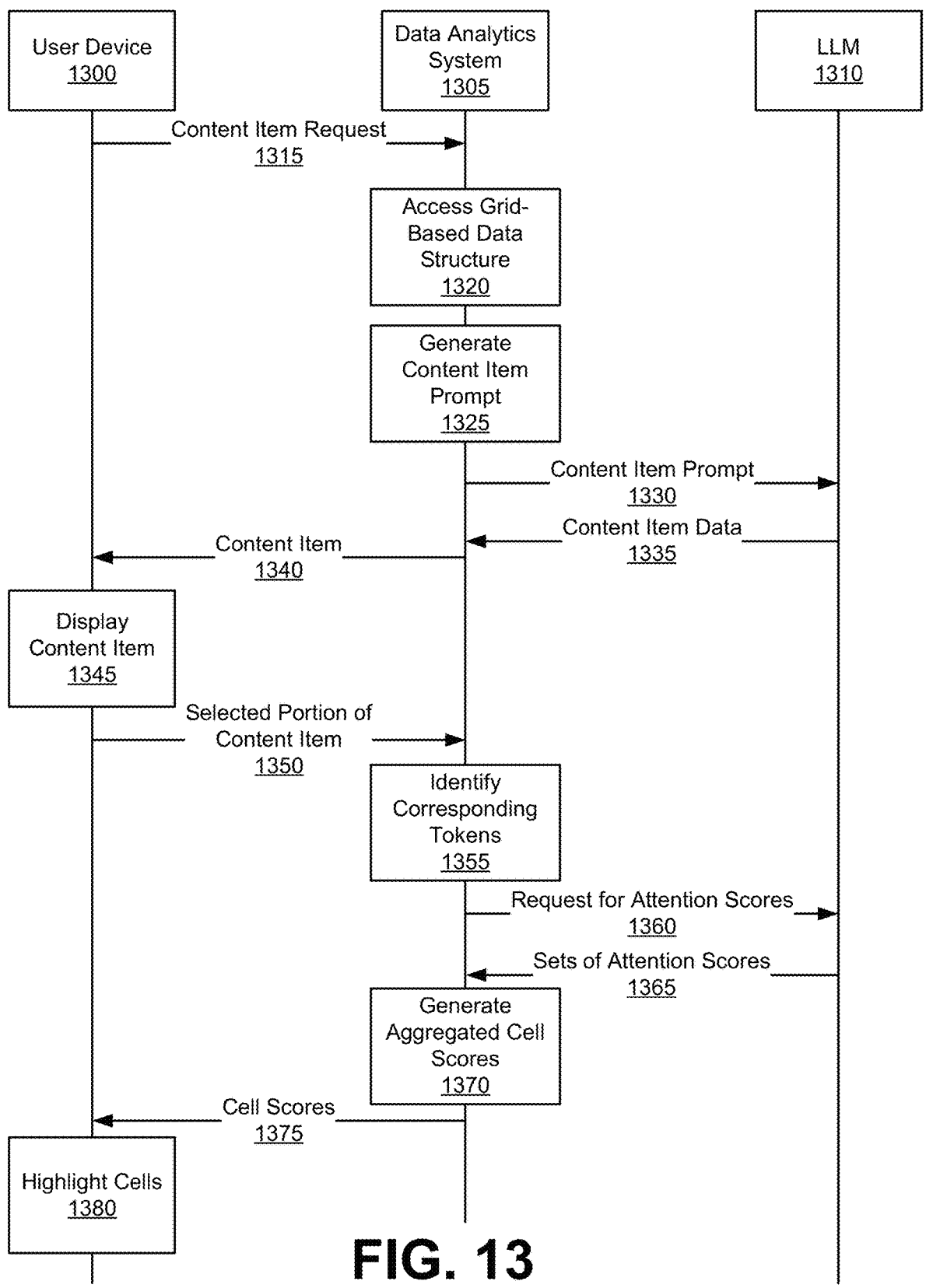
FIG. 13 is an interaction diagram illustrating an example method for generating a content item based on a grid-based data structure and highlighting relevant cells within a matrix user interface, in accordance with some embodiments.

FIG. 13 is an interaction diagram illustrating an example method for generating a content item based on a grid-based data structure and highlighting relevant cells within a matrix user interface, in accordance with some embodiments. Alternative embodiments may include more, fewer, or different steps from those illustrated in FIG. 10, and the steps may be performed in a different order from that illustrated in FIG. 10. Furthermore, the functionality may be divided among the devices differently from that illustrated in FIG. 10.

The data analytics system 1305 receives a content item request 1315 from a user device 1300. A content item request is a request from a user of the user device to generate a content item based on a grid-based data structure. The content item request may include an indication of a type of content item to be generated. The content item request also may include a text query describing the user's instructions in generating the content item (e.g., what the content item should describe or how the content item should be formatted). The user device may display a content generation user interface that allows the user to generate the content item request. For example, the content generation user interface may include UI elements for selecting a type of content item to be generated or for inputting a text query. In some embodiments, the content generation user interface is part of a matrix user interface.

Figure 14A:
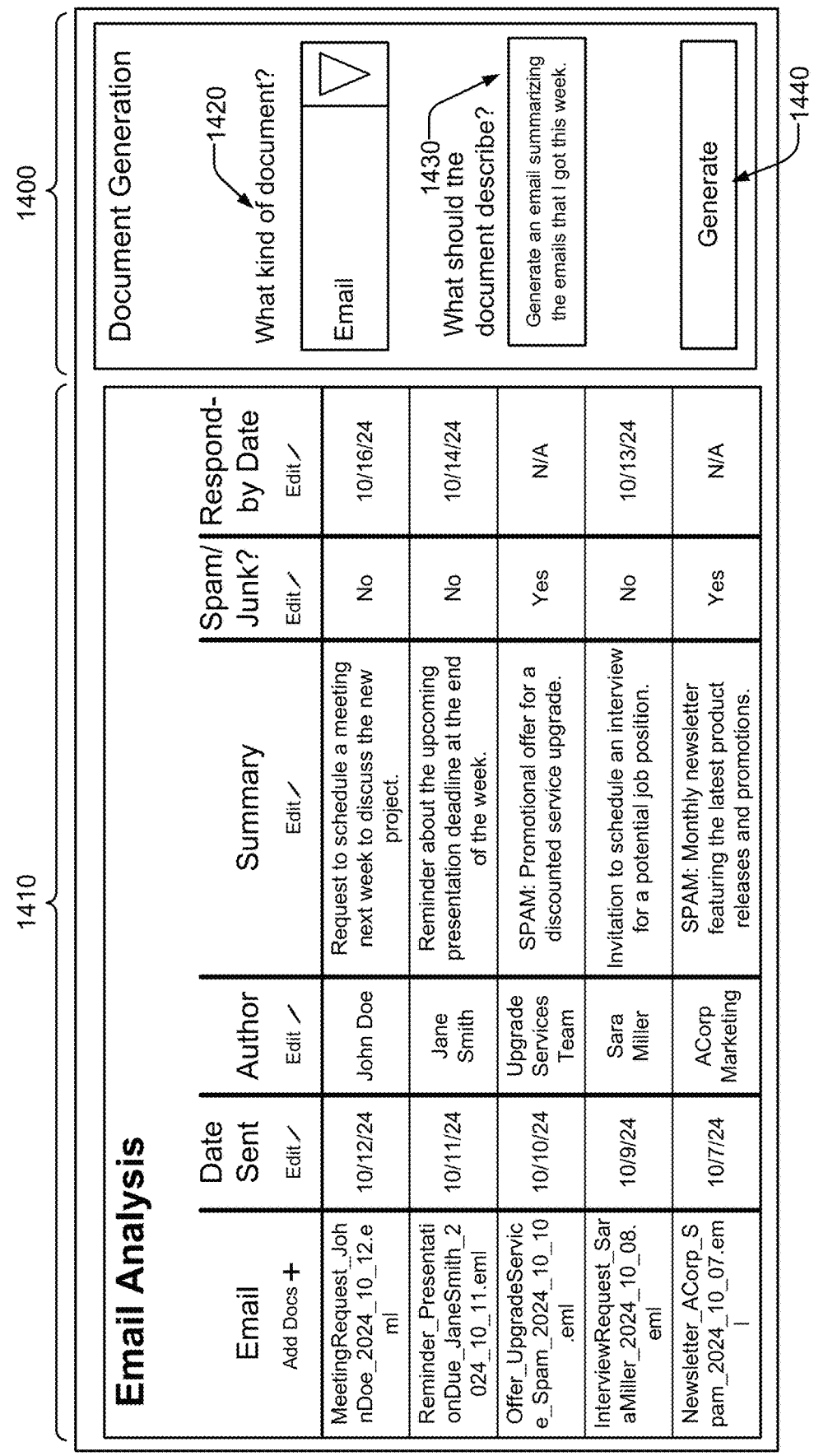
FIG. 14A illustrates an example content generation interface displayed alongside a matrix user interface, in accordance with some embodiments.

FIG. 14A illustrates an example content generation interface 1400 displayed alongside a matrix user interface 1410, in accordance with some embodiments. The content generation interface includes a UI element 1420 for selecting a type of content item for the data analytics system to generate. The content generation interface also includes a UI element 1430 through which the user can input a text query for the content generation request and a UI element 1440 that causes the user device to generate the content generation request. The content generation interface may also include user interface elements for specifying a format or styling of the content item. In some embodiments, the user can upload an example content item that the data analytics system can use as an example for generating the content item.

FIG. 14B illustrates an example content generation interface 1400 displaying a content item 1450 generated by the data analytics system, in accordance with some embodiments. The content generation interface may further include a UI element 1460 for downloading a local copy of the content item.

The data analytics system accesses 1320 a grid-based data structure. The data analytics system may access a grid-based data structure that is displayed in the matrix user interface. In some embodiments, the data analytics system generates the grid-based data structure based on the content item request. For example, the data analytics system may use a text query in the content item request for generating a grid-based data structure, such as in the example method described above with regards to FIG. 8.

The data analytics system generates 1325 a content item prompt based on the contents of cells in the grid-based data structure. A content item prompt is a prompt to the LLM 1310 to generate content item data for a content item. A content item prompt may contain similar data to a chat prompt as described above with regards to FIG. 10 and may be generated using a similar process. For example, the data analytics system may filter column prompts or sources in the grid-based data structure to identify cell values to include in the content item prompt.

However, whereas a chat prompt may simply include instructions to generate text for a response to a chat query, a content item prompt may include instructions of what kind of data to generate for a content item. For example, if the user requests that the generated content item be a set of slides for a presentation, the content item prompt may include instructions to not only generate text for slides but what kinds of text to generate (e.g., slide titles vs. slide contents) and how to format the slides (e.g., where to include text vs. images).

Thus, the content item prompt may include instructions on what content item data to generate. Content item data, as used herein, is data generated by an LLM that the data analytics system uses to generate a content item. For example, the content item data may include raw data, such as text or images, to be included in the content item. The content item data may also include formatting instructions for how to format the raw data in the content item.

The data analytics system transmits the content item prompt 1330 to the LLM 1310 and receives content item data 1335 generated by the LLM. The data analytics system generates a content item 1340 based on the received content item data and transmits the content item 1340 to the user device for storage at the client device and display 1345 to the user. The user device may display the content item in its own user interface or in a user interface that is alongside the matrix user interface. The data analytics system also may store the content item and make the content item accessible to the user through the user device. Similarly, the data analytics system may transmit the content item to a third-party storage system for storage.

In some embodiments, the data analytics system uses different agent systems for different types of content items. For example, the data analytics system may use a content item type specified in the content item request to determine which agent system to use to generate the content item. Each of these agent systems may be configured to generate content items of their respective types. The data analytics system may pass the content item request to the appropriate agent system and that agent system may perform the above process to generate the content item.

In some embodiments, the data analytics system highlights cells of a displayed matrix user interface based on a selected portion of the content item. The data analytics system receives a selected portion 1350 of a displayed content item from the user device. The user interface displaying the content item may allow a user to select portions of the content item, such as by highlighting text or by placing a bounding box around a section of text or an image. The user device transmits the selected portion of the content item to the data analytics system. In some embodiments, the user device transmits an indication of which portions of the content item were selected without transmitting the actual portion of the content item itself.

FIG. 14C illustrates an example content generation interface 1400 displaying a selected portion 1470 of a content item 1450 generated by the data analytics system, in accordance with some embodiments. The user may use the content generation interface 1400 to select a portion 1470 of the content item. The data analytics system highlights cells 1480 of the matrix user interface based on the selected portion 1470 of the content item.

The data analytics system identifies 1355 a set of tokens from the content item data that correspond to the selected portion of the content item. The LLM may generate content item data by iteratively generating tokens based on a set of input tokens. Thus, the output of the LLM's response to the content item prompt is a sequence of tokens. The data analytics system identifies which tokens in this sequence of tokens correspond to the selected portion of the content item. For example, the data analytics system may store a mapping of portions of the content items to indices in the sequence of tokens to identify which tokens correspond to the selected portion.

The data analytics system requests 1360 a set of attention scores for each of the identified tokens. Each attention score is a score that indicates how much an input token is relevant to an output token. For example, each attention score may be a weight applied to a value vector within a self-attention mechanism of the LLM. The attention scores may be the attention scores generated in one or more attention heads of a last attention block of the LLM. Alternatively, the overall attention scores may be computed based on attention scores generated from multiple attention blocks within the LLM. The data analytics system may access the attention scores directly or may request the attention scores through some protocol (e.g., an application programming interface) between the data analytics system and a model serving system hosting the LLM.

The set of attention scores for each identified token are scores that correspond to the set of tokens in the content item prompt from cells in the grid-based data structure. As noted above, the content item prompt includes the contents of a set of cells from the grid-based data structure. The contents of these cells are converted into input tokens that are input to the LLM to generate the output tokens in the content item data. Each of the attention scores for an identified output token corresponds to one of the input tokens from the contents of a cell. Thus, the set of attention scores for each token correspond to the relevance of each of the input tokens from the cell to the corresponding identified output token.

Figure 15A:
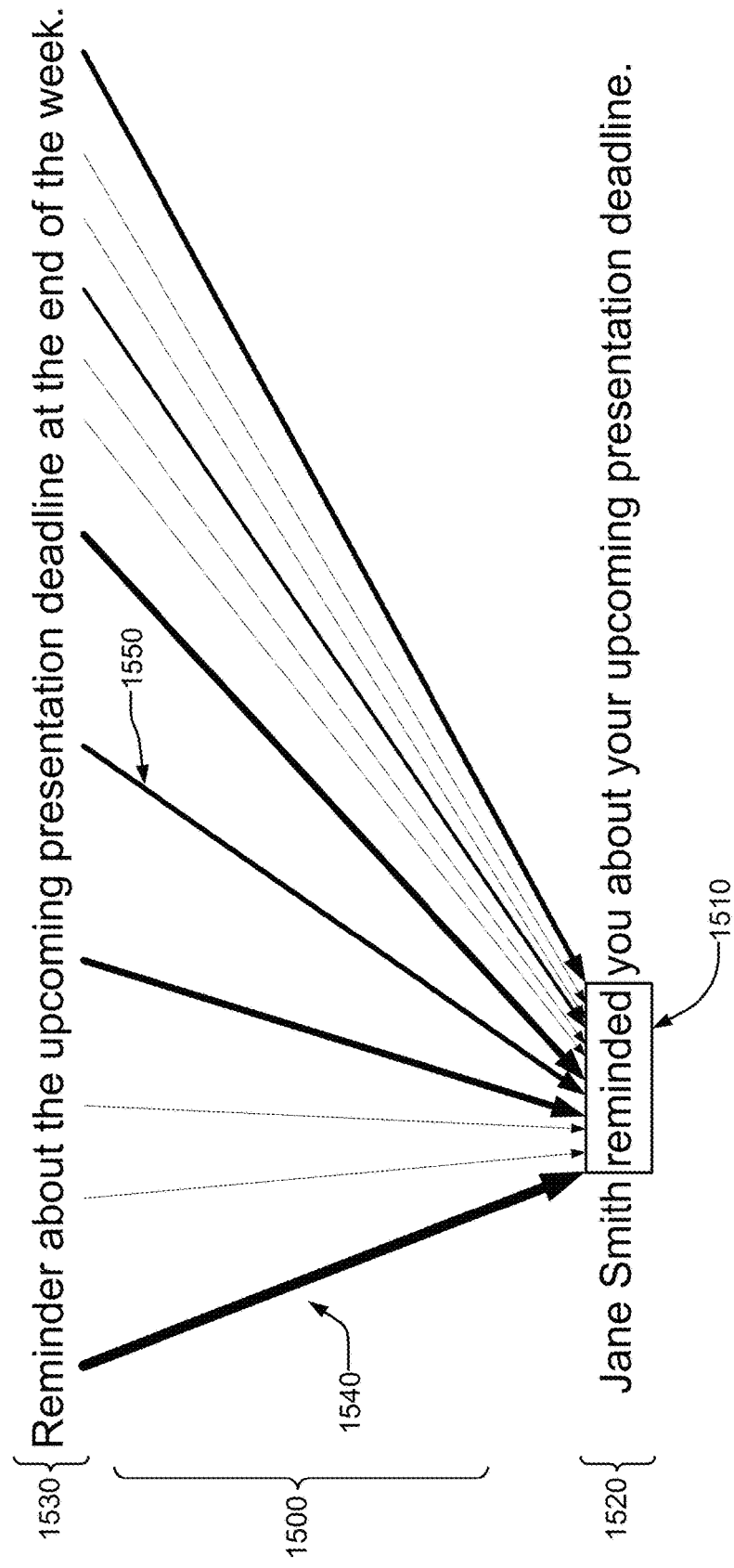
FIGS. 15A and 15B illustrate example sets of attention scores for identified tokens in a selected portion of a content item, in accordance with some embodiments.
Figure 15B:
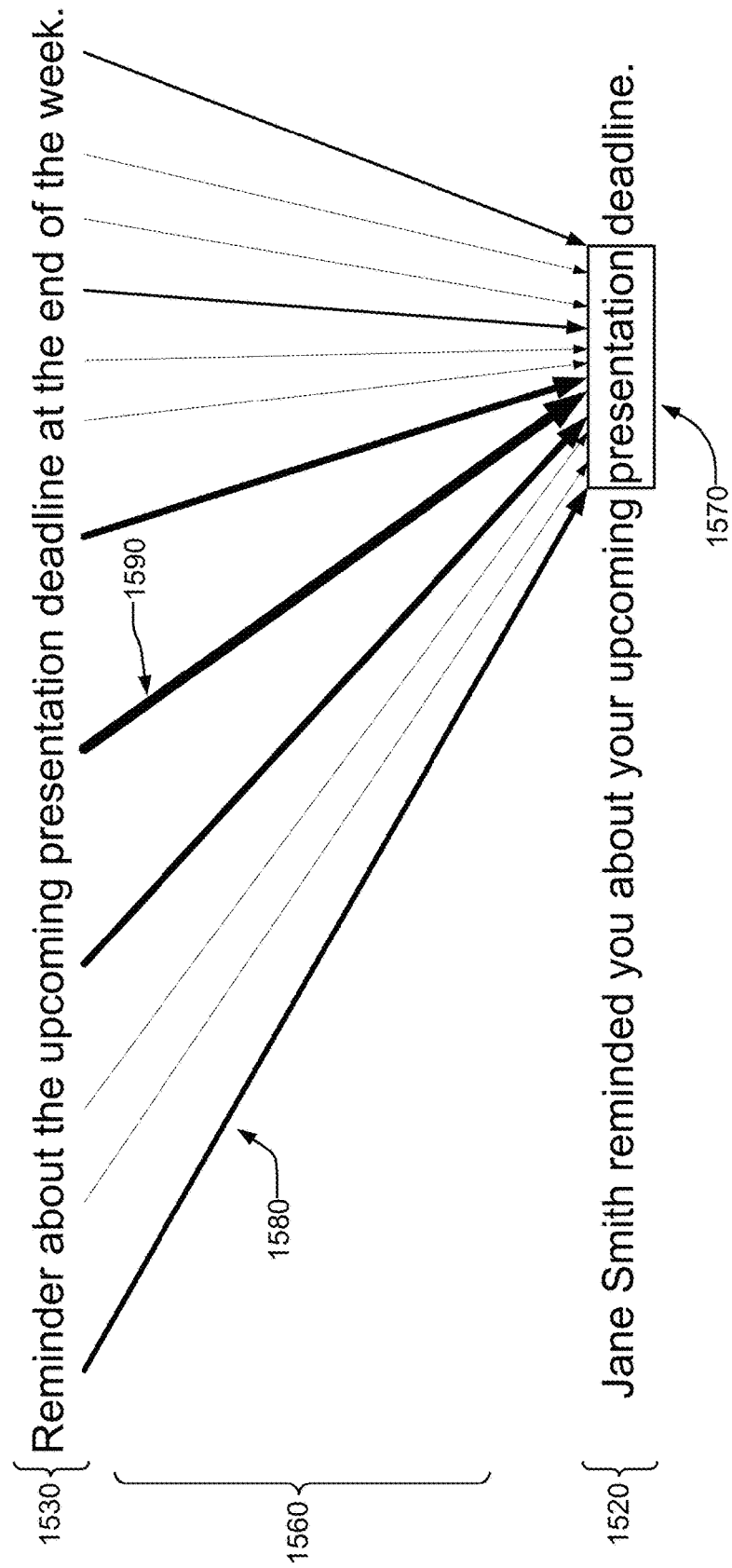

FIGS. 15A and 15B illustrate example sets of attention scores for identified tokens in a selected portion of a content item, in accordance with some embodiments. In the illustrated examples, each word in the text from the cell contents and each word in the selected portion of the content item corresponds to a single token. However, in some embodiments, tokens may correspond to parts of words.

FIG. 15A illustrates a set of attention scores 1500 for the "reminded" token 1510 of the selected portion 1520 of the content item. Each of the attention scores 1500 corresponds to a token of a set of tokens 1530 from a cell in the grid-based data structure and the thickness of each arrow illustrates a weight of the corresponding attention score. For example, the attention score 1540 for "Reminder" may be higher than the attention score 1550 for "presentation."

FIG. 15B illustrates a set of attention scores 1560 for the "presentation" token 1570 of the selected portion 1520 of the content item. As illustrated, the attention scores may be different for the "presentation" token. For example, the attention score 1580 for "Reminder" may now be lower than the attention score 1590 for "presentation."

The LLM transmits the sets of attention scores 1365 to the data analytics system and generates 1370 an aggregated score for each cell based on the attention scores for the input tokens in each cell. The data analytics system may identify, for each input token in a cell, the attention scores in the sets of attention scores that correspond to that input token. The data analytics system may compute an aggregated score for the cell by aggregating the attention scores for all of the input tokens in the cell. For example, the data analytics system may compute an average attention score for the set of input tokens to compute the aggregated score for the cell.

The data analytics system transmits the cell scores 1375 to the user device and the user devices highlights 1380 cells in the matrix user interface based on the cell scores. For example, the data analytics system may change a color of the cells or a border of each cell based on the cell scores.

In some embodiments, the user may manually overwrite cell values and instruct the data analytics system to regenerate the content item based on the revised cell values. For example, if the initial content item contains an error or the user wants to change some aspect of the initial content item, the user can use the highlights of the cells to identify which cells were most impactful in generating the content item and revise those cells to make their desired changes.

Additional Considerations

While the description herein may primarily describe a data analytics system that uses an LLM to perform the described functionality, any suitable model or algorithm may be used to perform the above-described functionality. For example, the data analytics system may use a multi-modal generative model to generate responses to prompts. Thus, the terms "large language model" or LLM, when used here, can generally be generalized to any generative model that generates content (e.g., text content) based on a prompt.

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine learning models in the performance of their described functionalities. A "machine learning model," as used herein, comprises one or more machine learning models that perform the described functionality. Machine learning models may be stored on one or more computer-readable media with a set of weights. These weights are parameters used by the machine learning model to transform input data received by the model into output data. The weights may be generated through a training process, whereby the machine learning model is trained based on a set of training examples and labels associated with the training examples. The training process may include: applying the machine learning model to a training example, comparing an output of the machine learning model to the label associated with the training example, and updating weights associated for the machine learning model through a back-propagation process. The weights may be stored on one or more computer-readable media, and are used by a system when applying the machine learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or." For example, a condition "A or B" is satisfied by any one of the following: A is true (or present) and B is false (or not present), A is false (or not present) and B is true (or present), and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method comprising:
   receiving a plurality of sources at a data analytics system, where each of the plurality of sources comprises a data file;
   storing a grid-based data structure at the data analytics system, where the grid-based data structure comprises a set of rows, a set of columns, and a set of cells, where each cell of the set of cells has a corresponding row of the set of rows and column of the set of columns, where each row of the set of rows has a unique corresponding source of the plurality of sources, where each column of the set of columns has a unique corresponding column prompt, and where each column prompt is free text for a prompt to apply to each of the plurality of sources to generate values for cells in the corresponding column;
   displaying a user interface to a user through a client device, wherein the user interface comprises a matrix user interface that displays the set of rows, the set of columns, and the set of cells of the grid-based data structure, where each row of the set of rows is displayed with an indication of the corresponding source of the row, and where each column is displayed with an indication of the corresponding column prompt of the column;
   populating each cell of the set of cells of the grid-based data structure by, for each cell of the set of cells of the grid-based data structure:
   identifying a source of the plurality of sources corresponding to a row of the cell;
   identifying a column prompt corresponding to a column of the cell;
   generating a final prompt for the cell based on the identified source and the identified column prompt, wherein the final prompt comprises text from the identified column prompt and text from the identified source;
   transmitting the final prompt to a large language model;
   receiving a response to the final prompt from the large language model; and
   updating the matrix user interface to display a populated version of the cell based on the received response to the final prompt, where the populated version of the cell comprises at least a portion of the received response.

2. The method of claim 1, further comprising:
   for each of the plurality of sources, generating a plurality of chunks of the source, where each chunk comprises a set of sections of the source that are semantically related to each other; and
   for each cell of the set of cells of the grid-based data structure:
   generating a plurality of context window prompts, wherein each context window prompt comprises the column prompt associated with the column of the cell and a subset of the plurality of chunks of the source associated with the cell;
   receiving responses to the plurality of context window prompts from a large language model; and
   generating the final prompt for the cell based on the received responses to the plurality of context window prompts.

3. The method of claim 2, wherein each section of the set of sections corresponds to a distinct portion of the corresponding source based on a structure of the source.

4. The method of claim 2, wherein each chunk comprises a set of sections that are sequential within the source.

5. The method of claim 2, wherein generating a context window prompt comprises:
   identifying a subset of the plurality of chunks with a total token size less than a threshold value.

6. The method of claim 1, wherein receiving the plurality of sources comprises:
   receiving locator information for each of the plurality of sources.

7. The method of claim 1, further comprising:
   receiving each column prompt through a prompt user interface displayed to the user by the client device.

8. The method of claim 7, wherein receiving each column prompt comprises:
  receiving parameters for prompting the large language model through the prompt user interface.

9. The method of claim 1, further comprising:
  receiving an indication from the user through the client device to collapse a subset of the set of rows; and
  responsive to receiving the indication, updating the matrix user interface to display a single row for the subset of rows, wherein each cell associated with the single row displays cell contents for a single source of a subset of sources corresponding to the subset of rows.

10. The method of claim 1, wherein generating the final prompt comprises:
  generating a final prompt for multiple cells of the set of cells, wherein the final prompt comprises multiple column prompts corresponding to the multiple cells.

11. A non-transitory computer-readable medium storing instructions that, when executed by a processor, cause the processor to perform operations comprising:
  receiving a plurality of sources at a data analytics system, where each of the plurality of sources comprises a data file;
  storing a grid-based data structure at the data analytics system, where the grid-based data structure comprises a set of rows, a set of columns, and a set of cells, where each cell of the set of cells has a corresponding row of the set of rows and column of the set of columns, where each row of the set of rows has a unique corresponding source of the plurality of sources, where each column of the set of columns has a unique corresponding column prompt, and where each column prompt is free text for a prompt to apply to each of the plurality of sources to generate values for cells in the corresponding column;
  displaying a user interface to a user through a client device, wherein the user interface comprises a matrix user interface that displays the set of rows, the set of columns, and the set of cells of the grid-based data structure, where each row of the set of rows is displayed with an indication of the corresponding source of the row, and where each column is displayed with an indication of the corresponding column prompt of the column;
  populating each cell of the set of cells of the grid-based data structure by, for each cell of the set of cells of the grid-based data structure:
    identifying a source of the plurality of sources corresponding to a row of the cell;
    identifying a column prompt corresponding to a column of the cell;
    generating a final prompt for the cell based on the identified source and the identified column prompt, wherein the final prompt comprises text from the identified column prompt and text from the identified source;
    transmitting the final prompt to a large language model;
    receiving a response to the final prompt from the large language model; and
    updating the matrix user interface to display a populated version of the cell based on the received response to the final prompt, where the populated version of the cell comprises at least a portion of the received response.

12. The computer-readable medium of claim 11, the operations further comprising:
  for each of the plurality of sources, generating a plurality of chunks of the source, where each chunk comprises a set of sections of the source that are semantically related to each other; and
  for each cell of the set of cells of the grid-based data structure:
    generating a plurality of context window prompts, wherein each context window prompt comprises the column prompt associated with the column of the cell and a subset of the plurality of chunks of the source associated with the cell;
    receiving responses to the plurality of context window prompts from a large language model; and
    generating the final prompt for the cell based on the received responses to the plurality of context window prompts.

13. The computer-readable medium of claim 12, wherein each section of the set of sections corresponds to a distinct portion of the corresponding source based on a structure of the source.

14. The computer-readable medium of claim 12, wherein each chunk comprises a set of sections that are sequential within the source.

15. The computer-readable medium of claim 12, wherein generating a context window prompt comprises:
  identifying a subset of the plurality of chunks with a total token size less than a threshold value.

16. The computer-readable medium of claim 11, wherein receiving the plurality of sources comprises:
  receiving locator information for each of the plurality of sources.

17. The computer-readable medium of claim 11, the operations further comprising:
  receiving each column prompt through a prompt user interface displayed to the user by the client device.

18. The computer-readable medium of claim 17, wherein receiving each column prompt comprises:
  receiving parameters for prompting the large language model through the prompt user interface.

19. The computer-readable medium of claim 11, the operations further comprising:
  receiving an indication from the user through the client device to collapse a subset of the set of rows; and
  responsive to receiving the indication, updating the matrix user interface to display a single row for the subset of rows, wherein each cell associated with the single row displays cell contents for a single source of a subset of sources corresponding to the subset of rows.

20. The computer-readable medium of claim 11, wherein generating the final prompt comprises:
  generating a final prompt for multiple cells of the set of cells, wherein the final prompt comprises multiple column prompts corresponding to the multiple cells.

* * * * *